United States Patent [19]
Kato et al.

[11] Patent Number: 5,536,567
[45] Date of Patent: Jul. 16, 1996

[54] MAGNETIC RECORDING MEDIUM HAVING AN UPPER MAGNETIC LAYER AND A LOWER MAGNETIC LAYER COMPRISING FERROMAGNETIC POWDER, CARBON BLACK AND A SPECIFIED POLYURETHANE BINDER

[75] Inventors: Atsushi Kato; Yuji Kato; Haruo Ishizaki; Takahiro Takayama, all of Miyagi, Japan

[73] Assignee: Sony Corporation, Tokyo, Japan

[21] Appl. No.: 412,588

[22] Filed: Mar. 29, 1995

[30] Foreign Application Priority Data

Dec. 29, 1993 [JP] Japan ................................ 5-351629
Jul. 22, 1994 [JP] Japan ................................ 6-191836

[51] Int. Cl.$^6$ ................................................ G11B 5/00
[52] U.S. Cl. .................. 428/323; 428/336; 428/425.9; 428/522; 428/694 BU; 428/694 BM; 428/694 BG; 428/900
[58] Field of Search ............... 428/425.9, 694 BU, 428/694 BM, 900, 323, 336, 522, 694 BG

[56] References Cited

U.S. PATENT DOCUMENTS

| | | | |
|---|---|---|---|
| 5,219,663 | 6/1993 | Kohno et al. ................ | 428/425.9 |
| 5,326,618 | 7/1994 | Ryoke et al. ................ | 428/141 |
| 5,371,166 | 12/1994 | Farkas ........................ | 528/71 |

Primary Examiner—Stevan A. Resan
Attorney, Agent, or Firm—Hill, Steadman & Simpson

[57] ABSTRACT

Disclosed is a magnetic recording medium having a first magnetic layer 2 and a second magnetic layer 4 laminated on a non-magnetic support in this order, wherein the binder in the lower first magnetic layer 2 comprises only polyurethane resin(s) having tertiary amines as polar groups or only said polyurethane resin(s) and a curing agent or comprises a mixed system composed of polyurethane resin(s) having tertiary amines as polar groups and amine-modified vinyl chloride-based resin(s) or of these resins and a curing agent. The first magnetic layer 2 may contain carbon black having a specifically-defined mean particle size. The coatability of the magnetic coating compositions is improved. The electromagnetic conversion characteristics (especially, video S/N, chroma output power, chroma S/N) of the medium are improved. Since the crosslinking of the components constituting the lower magnetic layer is improved, the dropout of the medium is not increased even after stored. This invention provides a magnetic recording medium capable of being subjected to long-sustained, high-quality recording and reproduction in severe conditions. The medium has high electric resistance, high light transmittance and good running durability, even though not having a back coat layer.

9 Claims, 1 Drawing Sheet

MAGNETIC RECORDING MEDIUM HAVING AN UPPER MAGNETIC LAYER AND A LOWER MAGNETIC LAYER COMPRISING FERROMAGNETIC POWDER, CARBON BLACK AND A SPECIFIED POLYURETHANE BINDER

BACKGROUND OF THE INVENTION

The present invention relates to magnetic recording media such as magnetic tapes, magnetic discs, etc. More precisely, it relates to magnetic recording media, such as video tapes, audio tapes, etc., which have plural magnetic layers on a non-magnetic support.

Recently, means of laminating plural magnetic layers on a non-magnetic support to produce magnetic recording media, such as video tapes, audio tapes, etc., having improved characteristics have been employed with the tendency of VTR, etc. toward shortened electromagnetic waves for recording and toward increased densities of information to be recorded.

These magnetic recording media, as having plural magnetic layers each differently comprising magnetic powders having different magnetostatic characteristics, particular binders, additives, etc., have particular frequency characteristics, electromagnetic conversion characteristics, durability, etc., which, however, other magnetic recording media having a single magnetic layer could not have.

To produce such magnetic recording media having plural magnetic layers, it is necessary to develop different magnetic compositions for upper and lower magnetic layers which differently satisfy the necessary magnetic characteristics and mechanical characteristics for these layers. It is well known that coated magnetic recording media to be produced by coating a magnetic composition, which is obtained by mixing and dispersing a fine ferromagnetic powder in an organic solvent along with a binder, an abrasive and other additives, on a support have significantly different characteristics, depending on the binder used.

For instance, the uppermost magnetic layer of such a coated magnetic recording media having plural magnetic layers, which slides on a head relatively to the motion of the head, is required to have good durability. Therefore, a relatively large amount of a lubricant is added thereto, or the layer often contains a binder having a glass transition point higher than that of the binder in the lower magnetic layer by 10° C. or more (see Japanese Patent Laid-Open No. 2-105326). The upper layer often contains a binder having a larger molecular weight than that of the binder in the lower layer (see Japanese Patent Laid-Open Nos. 1-79931 and 1-263927).

The lower layer often contains a polyurethane resin so as to improve the adhesiveness between the layer and the non-magnetic support to thereby improve the contact between the magnetic recording medium and the head with which the medium is kept in contact (see Japanese Patent Laid-Open No. 3-173923).

In addition to these mentioned hereinabove, other various binders for magnetic compositions for forming magnetic layers have been investigated with respect to their structures and polar groups in order to improve their dispersibility in magnetic compositions (see Japanese Patent Laid-Open Nos. 2-110825 and 3-80425).

However, if magnetic compositions comprising such known binders are coated on a support to form plural layers thereon by high-speed extrusion coating or by wet-on-wet coating where the upper layer is coated while the lower layer is still wet, streaks are often formed in the coating direction on the coated surface. Such streaks are significantly problematic in that these often worsen the degree of roughness of the surface of the magnetic recording medium having the layers and that these often cause spacing between the surface of the magnetic recording medium and the head with which the medium is kept in contact, thereby worsening the electromagnetic conversion characteristics of the medium.

The necessary characteristics of binders to be in magnetic layers differ between the uppermost layer that slides on a head relatively to the motion of the head and the other layers (lower layers). Depending on the combination of such binders, therefore, streaks are often formed in the coating direction on the coated surface of a magnetic recording medium having plural magnetic layers, as mentioned above. As the case may be, large streaks are often formed. It is known that binders having good coatability and their combinations are important. Therefore, it is necessary to investigate such binders and their combinations. In addition, binders for magnetic compositions must still be improved in order to satisfy both the coatability and the dispersibility of the magnetic compositions containing them.

SUMMARY OF THE INVENTION

One object of the present invention is to provide a magnetic recording medium having plural magnetic layers on a support, which is free from the above-mentioned streaks to be formed on its surface during coating the layers on the support and therefore has an improved shape, of which the electromagnetic conversion characteristics are not worsened due to the spacing between the surface of the medium and a head with which the medium is kept in contact, the spacing being caused by the roughness of the uppermost magnetic layer of a magnetic recording medium, and which therefore has excellent electromagnetic conversion characteristics which, however, a magnetic recording medium having a single magnetic layer does not have.

Another object of the present invention is to provide a magnetic recording medium, of which the magnetic layers (especially, the lower layer) has, in addition to the above-mentioned characteristics, improved toughness and mechanical strength.

Still another object of the present invention is to provide a magnetic recording medium which has reduced electric resistance and light permeability and has an improved property of running on a head, etc., even though it has no back coat layer, and to provide a method for producing it.

In order to attain the above-mentioned objects, we, the present inventors have assiduously studied and have found that, when a polyurethane resin having particular polar groups is used as the binder in the coating composition for the lower magnetic layer, that is not brought into contact with a head, of a magnetic recording medium having plural magnetic layers, the coating composition obtained has excellent coatability. On the basis of this finding, we have attained the present invention.

Specifically, the present invention provides a magnetic recording medium having a first magnetic layer (lower layer) and a second magnetic layer (upper layer) each comprising a ferromagnetic powder dispersed in a binder and both formed on a non-magnetic support in this order, wherein the binder in said first magnetic layer (lower layer) comprises polyurethane resin(s) having tertiary amines as polar groups or comprises said polyurethane resin(s) and a curing agent.

Figure 1:
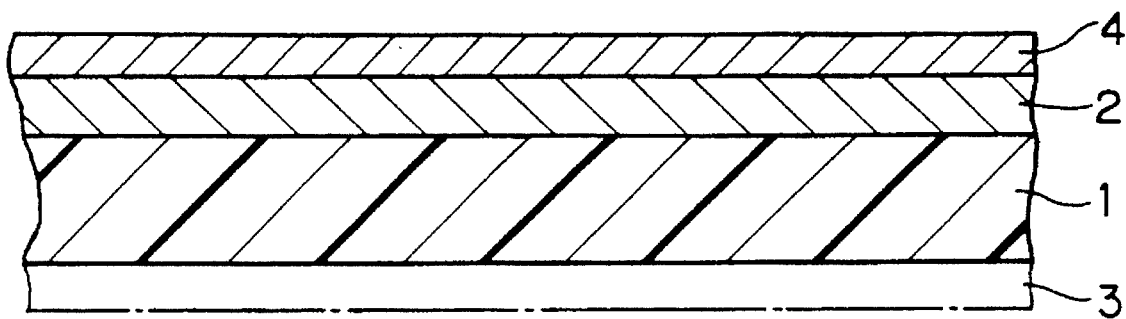
FIG. 1 is a cross-sectional view showing one embodiment of the magnetic recording medium of the present invention.

In these drawings, 1 is a non-magnetic support, 2 is a lower magnetic layer, 3 is a back coat layer, 4 and 6 each are an upper magnetic layer, and 5 is a magnetic interlayer.

DETAILED DESCRIPTION OF THE INVENTION

The polyurethane resin having tertiary amines as polar groups, which is used as the binder in the lower magnetic layer of the magnetic recording medium of the present invention, is obtained by copolymerizing polyol(s), isocyanate(s) and a chain-extending agent (crosslinking agent) having a tertiary amine in the molecule.

The content of said polar groups of tertiary amines in this polyurethane resin is preferably from $10^{-7}$ mol/g to $10^{-2}$ mol/g, more preferably from $10^{-5}$ mol/g to $10^{-3}$ mol/g. If the content of said polar groups is more than the defined range, the dispersibility of the coating magnetic composition containing the polyurethane resin is improved but the coatability of the composition is rather worsened, often causing the generation of streaks on the coated surface. If, on the other hand, the content is less than the defined range, the dispersibility of the coating magnetic composition containing the polyurethane resin is worsened. The coating magnetic composition for the lower layer comprising, as the binder, polyurethane resin(s) having polar groups of tertiary amines, according to the present invention, satisfies both sufficient coatability and sufficient dispersibility.

The polyurethane resins for use in the present invention may have polar groups of tertiary amines in any of their main chain and side chains. Tertiary amines for use in the present invention include aliphatic amines, aromatic amines, alkanolamines, alkoxyalkylamines, etc. Concretely mentioned are, for example, dimethylamine, diethylamine, diisopropylamine, dioctylamine, diisobutylamine, diethanolamine, methylethanolamine, 2-methoxyethylamine, di-2-methoxyethylamine, N-methylaniline, N-methylbutylamine, N-methylphenylamine, etc.

The polyurethane resin to be in the lower layer may have small amounts (not more than $10^{-5}$ mol/liter) of other known polar groups, such as $SO_3Na$, $SO_3K$, $SO_3H$, COOH, COONa, phosphates, phosphoric acid, quaternary ammonium salts, epoxy groups, primary or secondary amines, sulfites, etc., in addition to tertiary amines.

The kind of the polyurethane resin for use in the present invention is not specifically defined. Any and every polyurethane resin that varies depending on the polyol component constituting it can be employed in the present invention, including, for example, polyester polyurethane resins such as adipate-type polyurethane resins, polycaprolactone-type polyurethane resins, etc., as well as polycarbonate-type, acryl-type and butadiene-type polyurethane resins, etc. Of these polyurethane resins, polyester polyurethane resins and polyether polyurethane resins are more effective.

The coating magnetic composition for use in the present invention may contain, if desired, two or more different polyurethane resins having tertiary amines as polar groups. For instance, it may contain two or more such polyurethane resins having different molecular weights. Since polyurethane resins having different molecular weights have different dispersibility, rigidity and durability, it is desired that different polyurethane resins are combined in accordance with the characteristics of the magnetic recording medium to be obtained according to the present invention. The polyurethane resins to be used in the present invention preferably have a number average molecular weight of from 10,000 to 70,000, more preferably from 15,000 to 50,000, in view of their effect.

Polyurethane resins having different glass transition points (Tg) may be combined for use in the present invention. Polyurethane resins having a low Tg have high adhesiveness and therefore have good coatability, while those having a high Tg have good dispersibility in coating magnetic compositions. Polyurethane resins having Tg of from −30° C. to 80° C. are preferred to be in the lower layer.

The lower magnetic layer may contain, in addition to the polyurethane resins having tertiary amines as polar groups, a polyisocyanate as a curing agent in an amount of from 5 to 30 parts by weight relative to 100 parts by weight of the binder, by which the adhesiveness, the rigidity and the durability of the layer are improved. However, the addition of such a polyisocyanate often worsens the storability of the coating magnetic composition containing it. In particular, if such a polyisocyanate is added to the composition in an amount of 40 parts by weight or more, the coatability of the composition is noticeably worsened. In view of the elasticity of the lower layer, the curing agent may not be added thereto. Even so, the layer may have sufficient adhesiveness and durability. Therefore, the suitable amount of the curing agent to be added to the lower layer is from 0 to 30 parts by weight, preferably from 0 to 20 parts by weight.

As the curing agent usable in the present invention, mentioned are aromatic polyisocyanates and aliphatic polyisocyanates. Preferred are adducts of these and active hydrogen-containing compounds. Examples of usable aromatic polyisocyanates include toluene diisocyanate (TDI), 1,3-xylene diisocyanate, 1,4-xylene diisocyanate, 4,4'-diphenylmethane diisocyanate (MDI), p-phenyl diisocyanate, m-phenyl diisocyanate, 1,5-naphthyl diisocyanate, etc. Examples of usable aliphatic polyisocyanates include hexamethylene diisocyanate (HDI), dicyclohexylmethane diisocyanate, cyclohexane diisocyanate, etc.

Examples of active hydrogen-containing compounds capable of forming adducts with these polyisocyanates include ethylene glycol, 1,4-butanediol, 1,3-butanediol, neopentyl glycol, diethylene glycol, trimethylolpropane, glycerin, etc. Of such adducts, preferred are those having a mean molecular weight of from 100 to 5,000.

According to the present invention, used is a composition comprising only polyurethane resin(s) having tertiary amines as polar groups or comprising such polyurethane resin(s) and a curing agent, as the binder for the lower magnetic layer, as mentioned hereinabove. The coating composition containing the binder has excellent coatability and dispersibility and forms a layer having excellent durability. Any other binder composition not containing such polyurethane resin(s) and, if desired, a curing agent worsens the dispersibility of the coating magnetic composition containing it and therefore often causes the generation of streaks in the coated layer.

We, the present inventors have further found that the magnetic layer, even though containing such polyurethane resin(s) optionally along with a polyisocyanate, could not often have sufficient rigidity and that the magnetic layer often causes head clogging and dropout. This is because the polyurethane resin(s) in the layer has/have lower crosslinkability than vinyl chloride-vinyl acetate copolymers so that the layer contains a large amount of non-crosslinked low-molecular components (oligomers) which bleed out onto the coated surface of the layer.

To compensate the drawbacks of the polyurethane resins, it may be considered to add highly-crosslinking vinyl chloride copolymers to the resins. However, the mere combination of said tertiary amine-containing polyurethane resins (polyurethane resins having tertiary amines as polar groups) having good coatability and such vinyl chloride copolymers brings about another problem in that the dispersibility of the coating magnetic composition containing them is worsened depending on the kind of the vinyl chloride copolymers therein.

We, the present have solved the problem by combining said tertiary amine-containing polyurethane resins and vinyl chloride copolymers having particular polar groups, by which the shape of the coated magnetic recording medium of the present invention is improved, the worsening of the electromagnetic conversion characteristics of the medium, which is caused by the spacing between the medium and a head with which the medium is kept in contact (the spacing is caused by the roughness of the surface of the magnetic layer of the medium), is prevented, and the rigidity of the coated magnetic layer as well as the crosslinkability of the tertiary amine-containing polyurethane resins is improved. The magnetic recording medium of the present invention thus containing vinyl chloride copolymer(s) having particular polar groups along with said tertiary amine-containing polyurethane resin(s) in the lower magnetic layer has excellent electromagnetic conversion characteristics which other magnetic recording media having a single magnetic layer do not have.

In order to overcome the above-mentioned problem, we, the present inventors have employed a composition comprising polyurethane resin(s) having tertiary amines as polar groups and highly-crosslinking amine-type vinyl chloride copolymer(s), as the binder to be in the lower magnetic layer which is not brought into contact with a moving magnetic head. We have found that the mixed binder does not worsen the dispersibility of the coating magnetic composition for the lower layer and that the composition has excellent coatability. On the basis of these findings, we have completed the present invention.

Accordingly, the present invention also provides a magnetic recording medium having a first magnetic layer (lower layer) comprising a magnetic powder dispersed in a binder and a second magnetic layer (upper layer) both formed on a non-magnetic support in this order, wherein the binder in said first magnetic layer (lower layer) comprises tertiary amine-containing polyurethane resin(s) (polyurethane resin(s) having tertiary amines as polar groups, as mentioned hereinabove) and amine-modified vinyl chloride resin(s) (vinyl chloride resin(s) having amine-type polar groups, especially vinyl chloride copolymers having such polar groups), especially only the both resins, or comprises the both resins and a curing agent.

In this magnetic recording medium, the binder to be in the lower magnetic layer comprises polyurethane resin(s) having tertiary amines as polar groups and vinyl chloride resin(s) having amine-type polar groups (especially, amine-modified vinyl chloride copolymers). In this, the former polyurethane resins are the same as those mentioned hereinabove, while the latter vinyl chloride resins are those to be obtained by any of a method of reacting a vinyl chloride copolymer or polyvinyl chloride and an amine compound and a method of copolymerizing amine-modified vinyl monomers and vinyl chloride or other monomers.

Amine compounds usable herein include aliphatic amines, alicyclic amines, alkanolamines, alkoxylamines, etc. As specific examples of these amines, mentioned are methylamine, ethylamine, propylamine, butylamine, cyclohexylamine, ethanolamine, naphthylamine, aniline, dimethylamine, diethylamine, diisopropylamine, dioctylamine, diisobutylamine, diethanolamine, methylethanolamine, 2-methoxyethylamine, di-2-methoxyethylamine, N-methylaniline, trimethylamine, triethylamine, triisobutylamine, tridecylamine, N-methylbutylamine, N-methylphenylamine, hexamethylenetetramine, triethanolamine, dimethylpropylamine, pyridine, piperidine, picoline, lutidine, quinoline, hexamethylenediamine, diaminopropane, etc.

As the amine-modified vinyl monomers to be copolymerized with vinyl chloride, usable are monomers of acrylates, methacrylates or acryl ethers having primary, secondary or tertiary amino group(s) (see Japanese Patent Laid-Open Nos. 3-80425 and 3-100918).

In addition to the above, other comonomers may be copolymerized to give copolymer resins having improved solubility for use in the present invention. Such comonomers include, for example, vinyl carboxylate monomers such as vinyl acetate, vinyl propionate, vinyl laurate, vinyl stearate, etc., alkyl (meth)acrylates such as methyl (meth)acrylate, ethyl (meth)acrylate, propyl (meth)acrylate, butyl (meth)acrylate, lauryl (meth)acrylate, stearyl (meth)acrylate, etc., and alkyl allyl ethers, etc.

In addition, OH-containing comonomers, such as vinyl alcohol and hydroxyalkyl (meth)acrylates, as well as polyoxyalkylene oxide (meth)acrylates, polyalkylene oxide allyl ethers, and epoxy-containing monomers such as glycidyl (meth)acrylate and allylglycidyl ether may also be copolymerized to give copolymers for use in the present invention. These copolymers are crosslinked with a polyisocyanate as a curing agent, by which the mechanical strength of the magnetic layer containing them is enhanced.

The preferred content of the amino groups in the amine-modified vinyl chloride resins for use in the present invention is from $1 \times 10^{-6}$ mol/g to $1 \times 10^{-3}$ mol/g, more preferably from $1 \times 10^{-5}$ mol/g to $1 \times 10^{-4}$ mol/g. If the content is more or less than the defined range, the dispersibility and the coatability of the coating magnetic composition containing the resin(s) are worsened.

Like the above-mentioned polyurethane resins, two or more of these amine-modified vinyl chloride copolymers can be combined to be in the lower magnetic layer. It is effective that the amine-modified vinyl chloride resins to be used in the present invention have a number average molecular weight of from 5,000 to 50,000, preferably from 10,000 to 40,000.

Where the amine-modified vinyl chloride resin(s) is/are combined with the above-mentioned tertiary amine-type polyurethane resin(s) to form the binder to be in the lower magnetic layer, it is desired that the proportion of the tertiary amine-type polyurethane resin(s) in the binder is 50% by weight or more of the total weight of the binder and therefore the proportion of the amine-modified vinyl chloride resin(s) in the same is less than 50% by weight of the same, in view of the above-mentioned effect to be attained by the combination of these two resins. More preferably, the content of the tertiary amine-type polyurethane resin(s) in the binder is from 50 to 80% by weight.

A polyisocyanate may be added, as a curing agent, to the binder comprising polyurethane resin(s) having tertiary amines as polar groups and amine-modified vinyl chloride resin(s), in an amount of from 5 to 30% by weight of the binder. When the binder thus additionally comprising a polyisocyanate is used for forming the lower magnetic layer, the adhesiveness, the rigidity and the durability of the layer are improved. However, the addition of a polyisocyanate to the binder often worsens the storability of the coating magnetic composition containing the binder. In particular, when a polyisocyanate is added to the binder in an amount of 40% by weight or more, the coatability of the coating magnetic composition containing the binder is noticeably worsened. In view of the desired flexibility of the lower magnetic layer, such a curing agent may not be added to the binder. Even in the absence of such a curing agent, the adhesiveness and the durability of the lower magnetic layer are satisfactory. Therefore, the suitable amount of the curing agent to be added to the binder may be from 0 to 30% by weight, preferably from 0 to 20% by weight.

The curing agent usable in this case includes aromatic polyisocyanates and aliphatic polyisocyanates such as those mentioned hereinabove. Preferred are adducts of such polyisocyanates and active hydrogen-containing compounds. Regarding the adducts, those illustrated hereinabove are referred to.

The second magnetic layer to be provided as the upper layer over the first magnetic layer in the magnetic recording medium of the present invention is kept in contact with a head while relatively sliding thereon. Therefore, the second magnetic layer must have sufficient durability. In addition, in order to enhance the recording capacity of the medium (especially, the high frequency recording capacity for sufficient video outputting, etc.) of the present invention, it is desired that the second magnetic layer contains a magnetic powder having a larger specific surface area than that of the magnetic powder to be in the first magnetic layer (the first magnetic layer generally participates in audio outputting, chroma outputting, etc.).

The present invention also provides a magnetic recording medium comprising the above-mentioned first and second magnetic layers, in which the first magnetic layer additionally contains carbon black having a DBP oil absorption of from 30 to 150 mg/100 g, a mean particle size of from 5 to 150 nm, and a specific surface area measured by a BET method of from 40 to 300 $m^2/g$.

Recently, HSPs (high-speed printers) are employed especially to produce video soft wares. Therefore, studies for reducing the electric resistance of magnetic recording media to be used in such devices have been conducted so as not to make the media (e.g., tapes) entangled when they are run at a high speed in the devices. As the means for reducing the electric resistance, a method of adding a large amount of an electroconductive non-magnetic material, such as carbon black, etc., to the media is the most effective. In addition, since carbon black has excellent light-shieldability, it also acts to reduce the light transmittance of the media when the media are applied to a VHS system where a photosensor is used to detect the end part of each medium.

There are known many high-grade magnetic tapes having a back coat layer containing carbon black so as to improve their runnability and to reduce their electric resistance and light transmittance. Recently, it has become possible to control small hills on the surface of a non-magnetic support such as PET (polyethylene terephthalate), PEN (polyethylene naphthalate), etc. Using the thus-controlled support, it has become possible to obtain back coat-free magnetic tapes having excellent runnability.

Thus, multi-layered structures of magnetic recording media have been known which have a non-magnetic layer consisting essentially of carbon black as the lower layer without having a back coat layer to reduce their electric resistance and light transmittance.

Other multi-layered magnetic recording media are known in which both the upper layer and the lower layer are magnetic layers. The media are to obtain excellent frequency characteristics which, however, single-layered media cannot obtain. In the multi-layered media of this type, the lower layer must contain a large amount of carbon black so as to avoid the above-mentioned problems. In particular, special attention shall be paid to magnetic tapes not having a back coat layer so as not to make the tapes entangled, when wound up. To such tapes, therefore, the amount of carbon black to be added must be from 5 to 15% by weight relative to the weight of the ferromagnetic powder therein.

The conventional magnetic tapes of these types have problems in that the residual magnetic flux density (Br) is lowered due to the addition of such a large amount of additive to the lower layer and that the viscosity of the magnetic coating composition to be coated becomes extremely high since the structural viscosity of carbon black added is high.

In order to solve these problems, the above-mentioned binder of the present invention, which comprises polyurethane resin(s) having tertiary amines as polar groups (optionally along with vinyl chloride resin(s) having amine-type polar groups), is added to the first magnetic layer (lower layer). This is because the binder has an excellent viscosity characteristic or, that is, has high fluidity even at a low viscosity.

Even in the magnetic recording medium having the binder in the first magnetic layer (lower layer), carbon black can be added to said first magnetic layer so as to reduce the electric resistance and the light transmittance of the medium.

We, the present inventors have investigated for carbon black of a kind that can be added to the first magnetic layer and have found that the addition of some kinds of carbon black significantly often lowers the residual magnetic flux density (Br) of the medium containing it and that, if carbon black having an extremely high degree of oil absorption is added to the magnetic coating composition, the composition often becomes too viscous to be coated.

In addition, since the dispersibility of carbon black varies, depending on the mean particle size and the degree of acidity (pH), it is anticipated that carbon black will have an influence on the viscosity and the thixotropy of the magnetic coating composition containing it. For instance, when carbon black having a relatively large mean particle size is added to the lower magnetic layer, the surface roughness of the magnetic layer is enlarged to cause spacing between the medium and the head with which the medium is kept in contact with the result that the electromagnetic conversion characteristics of the medium are often worsened noticeably.

For these reasons, it has been required to investigate for carbon black of a kind that can be effectively added to the lower magnetic layer and to develop a composition containing the effective carbon black for the magnetic layer as well as a method for adding even an enlarged amount of the effective carbon black to the composition without worsening Br of the medium to be prepared by coating the composition.

In general, a back coat layer is provided so as to reduce the electric resistance of the medium and to improve the runnability thereof, as mentioned hereinabove. However, since such a back coat layer is coated on the surface of the support opposite to the surface coated with magnetic layers, the magnetic layer is kept in contact with the back coat layer when the tape (medium) is cured, while being wound up, with the result that the surface roughness of the both surfaces is often too much increased. The variation in the surface condition of the tape due to the curing reaction often makes the electromagnetic conversion characteristics of the tape worsened, or the materials transferred from the back coat layer to the magnetic layer often causes head clogging.

For these reasons, it has become necessary to develop a composition for a magnetic layer that is hardly charged even in the absence of a back coat layer, in order to produce a high-reliability magnetic recording medium more simply at lower costs.

In order to overcome the problems mentioned hereinabove, the present invention provides a multi-layered magnetic recording medium, especially a magnetic tape not having a back coat layer, in which the lower magnetic layer contains the above-mentioned binder comprising polyurethane resin(s) having tertiary amines as polar groups (optionally along with vinyl chloride resin(s) having amine-type polar groups), as combined with carbon black having a DPB oil absorption falling within the above-mentioned particular range, a mean particle size falling within the above-mentioned particular range and a specific surface area falling within the above-mentioned particular range. The magnetic coating composition for the lower magnetic layer, comprising said binder and said carbon black, has good coatability. Accordingly, the multi-layered magnetic recording medium of the present invention has effectively reduced electric resistance and light transmittance and has excellent electromagnetic conversion characteristics.

In the magnetic recording medium of the present invention, as having the constitution mentioned above, the surface of the non-magnetic support (e.g., PET, PEN or other non-magnetic supports) opposite to the surface thereof coated with the magnetic layers is exposed or, that is, this is not coated with a back coat layer. Therefore, the medium is free from the above-mentioned problems of surface roughening and head clogging.

It is desired that the carbon black to be in the lower magnetic layer has a DPB oil absorption of from 30 to 150 ml/100 g (preferably from 50 to 150 ml/100 g), a mean particle size of from 5 to 150 nm (preferably from 15 to 50 nm) and a specific surface area measured by a BET method of from 40 to 300 $m^2$/g (preferably from 100 to 250 $m^2$/g). It is preferred that the carbon black has a water content of from 0.1 to 10%, a tap density of from 0.1 to 1 g/cc and a pH of from 2.0 to 10.

If carbon black having a DPB oil absorption of more than 150 ml/100 g is added to the magnetic coating composition for the lower magnetic layer, the viscosity of the composition is too high and the dispersibility of the same is extremely bad. If, on the other hand, carbon black having a DPB oil absorption of less than 30 ml/100 g is added to the composition, the dispersibility of the composition is bad so that much time is needed to disperse the composition.

The smaller the mean particle size of carbon black to be in the coating composition, the longer the time needed for dispersing the composition but the better the surface condition of the coated layer. On the contrary, the larger the mean particle size of carbon black to be in the coating composition, the worse the surface condition of the coated layer. For these reasons, it is desired that the carbon black to be in the coating composition for the lower magnetic layer has a mean particle size of from 5 to 150 nm. The "mean particle size" as referred to herein indicates a mean value to be obtained by averaging the sum of the largest diameters of 100 particles of carbon black. The same shall apply hereinunder.

The specific surface area of carbon black to be in the coating composition has a great influence on the dispersibility of the composition. Therefore, the carbon black to be in the coating composition for the lower magnetic layer is desired to have a specific surface area measured by a BET method of from 40 to 300 $m^2$/g. In particular, carbon black having a specific surface area of more than 800 $m^2$/g cannot be dispersed sufficiently in the composition, unless it is dispersed by itself separately from the magnetic powder to be in the composition.

Regarding the addition of carbon black to the magnetic coating composition for the lower magnetic layer, we, the present inventors have found that, when carbon black is previously dispersed in the binder to form a slurry and thereafter the resulting slurry is added to the dispersion comprising the other components of the coating composition, then the magnetic coating composition thus obtained can be coated on the support at a high speed. The residual magnetic flux density (Br) of the magnetic recording medium having the lower magnetic layer thus coated is not lowered and the medium has effectively lowered electric resistance and light transmittance.

Thus, it is desired that the carbon black to be added to the first magnetic layer is first dispersed in an organic solvent along with the binder to form a slurry mixture and thereafter the slurry mixture is added to the dispersion comprising the other components of the layer to prepare the intended magnetic coating composition for the layer. The thus-prepared coating composition is coated on a non-magnetic support to form a first magnetic layer thereon, and thereafter a second magnetic layer is formed thereover to produce the magnetic recording medium of the present invention.

The viscosity of the magnetic coating composition for the lower layer that is prepared according to the above-mentioned slurry-forming method is lower than that of the composition that is prepared by dispersing carbon black along with a magnetic powder and, as a result, the coating composition prepared by said slurry-forming method can be coated on the support at a high speed.

As examples of carbon black that satisfies the above-mentioned conditions, mentioned are Raven 1250 (produced by Colombian Carbon Co.) (particle size: 23 nm, BET value: 135.0 $m^2$/g, DBP oil absorption: 58.0 ml/100 g); Raven 1255 (particle size: 23 nm, BET value: 125.0 $m^2$/g, DBP oil absorption: 58.0 ml/100 g); Raven 1020 (particle size: 27 nm, BET value: 95.0 $m^2$/g, DBP oil absorption: 60.0 ml/100 g); Raven 1080 (particle size: 28 nm, BET value: 78.0 $m^2$/g, DBP oil absorption: 65.0 ml/100 g); as well as Raven 1035, Raven 1040, Raven 1060, Raven 3300, Raven 450, Raven 780, etc.

Also employable in the present invention is Conductex SC (particle size: 20 nm, BET value: 220.0 $m^2$/g, DBP oil absorption: 115.0 ml/100 g). Further employable are #80 (produced by Asahi Carbon Co.) (particle size: 23 nm, BET value: 117.0 $m^2$/g, DBP oil absorption: 113.0 ml/100 g); #22B (produced by Mitsubishi Kasei Corp.) (particle size: 40 nm, BET value: 55.0 $m^2$/g, DBP oil absorption: 131.0 ml/100 g); #20B (particle size: 40 nm, BET value: 56.0 $m^2$/g, DBP oil absorption: 115.0 ml/100 g); Blackpearls L (produced by Cabbot Co.) (particle size: 24 nm, BET value: 250.0 $m^2$/g, DBP oil absorption: 60.0 ml/100 g); Blackpearls 800 (particle size: 17 nm, BET value: 240.0 $m^2$/g, DBP oil absorption: 75.0 ml/100 g); as well as Blackpearls 1000, Blackpearls 1100, Blackpearls 700, Blackpearls 905, etc.

The amount of carbon black to be added to the under magnetic layer of the magnetic recording medium of the present invention is preferably from 5 to 15 parts by weight relative to 100 parts by weight of the magnetic layer in the same layer. If the amount is too small, the above-mentioned effects are difficult to obtain, but if it is too large, the magnetic characteristics of the medium are bad and the dispersibility of the coating composition is bad.

The binder to be in the above-mentioned second magnetic layer (upper magnetic layer) of the magnetic recording medium of the present invention may be any known one. For instance, usable are vinyl chloride-vinyl acetate copolymers, vinyl chloride-vinyl acetate-vinyl alcohol copolymers, vinyl chloride-vinylidene chloride copolymers, vinyl chloride-acrylonitrile copolymers, vinyl chloride-vinyl acetate-maleic acid copolymers, acrylate-vinylidene chloride copolymers, acrylate-acrylonitrile copolymers, methacrylic acid-vinylidene chloride copolymers, methacrylate-styrene copolymers, thermoplastic polyurethane resins, phenoxy resins, polyvinyl fluorides, vinylidene chloride-acrylonitrile copolymers, butadiene-acrylonitrile copolymers, acrylonitrile-butadiene-methacrylic acid copolymers, polyvinyl butyrals, cellulose derivatives, styrene-butadiene copolymers, polyester resins, phenolic resins, epoxy resins, thermosetting polyurethane resins, urea resins, melamine resins, alkyd resins, urea-formaldehyde resins, polyvinyl acetal resins, and their mixtures, etc.

Of these, preferred are polyurethane resins, polyester resins and acrylonitrile-butadiene copolymers that are said to make the magnetic layer flexible; as well as cellulose derivatives, phenolic resins and epoxy resins that are said to make the magnetic layer tough. The above-mentioned binders may be crosslinked with isocyanate compounds to thereby improve the durability of the magnetic layer, or may have suitable polar groups (e.g., the above-mentioned $SO_3Na$, etc.).

The components, other than the above-mentioned binders, that constitute the magnetic layers of the magnetic recording medium of the present invention, such as ferromagnetic powder, lubricant, dispersing agent, abrasive, antistatic agent and anti-rusting agent, as well as the solvents to be used for preparing the magnetic coating compositions for the magnetic layers, and the non-magnetic support of the medium are not specifically defined but may be any known ones.

As the ferromagnetic powder to be in the above-mentioned magnetic layers (first and second magnetic layers), any known ferromagnetic material may be employed, including, for example, $\gamma$-FeOx (x=1.33 to 1.5), Co-modified $\gamma$-FeOx (x=1.33 to 1.5), ferromagnetic alloys consisting essentially (75% or more) of Fe, Ni or Co, barium ferrite, strontium ferrite, etc. The ferromagnetic powder may contain, in addition to the pre-determined atoms, other atoms of Al, Si, S, Sc, Ti, V, Cr, Cu, Y, Mo, Rh, Pd, Ag, Sn, Sb, Te, Ba, Ni, Ta, W, Re, Au, Hg, Pb, Bi, La, Ce, P, Mn, Zn, Co, Sr, B, etc.

As the lubricant for the magnetic layers, usable are, for example, silicone oils, fatty acid-modified silicone oils, fluorine-containing silicones and other fluorine-containing lubricants; polyolefins, polyglycols, alkylphosphates and their metal salts, polyphenyl ethers, fluoroalkyl ethers, alcohols having from 12 to 24 carbon atoms (these may contain unsaturated bonds or may be branched), higher fatty acids having from 12 to 24 carbon atoms and their esters (these may contain unsaturated bonds or may be branched); as well as amine lubricants such as amine salts of alkylcarboxylic acids, amine salts of fluoroalkylcarboxylic acids, etc.

Specific examples of the above-mentioned higher fatty acids and their esters include lauric acid, myristic acid, palmitic acid, stearic acid, isostearic acid, arachic acid, oleic acid, eicosanoic acid, elaidic acid, behenic acid, linolic acid, linolenic acid, octyl stearate, isooctyl stearate, octyl myristate, isooctyl myristate, butoxyethyl stearate, butyl stearate, heptyl stearate, etc. Two or more of lubricants can be used in combination.

As the dispersing agents, known dispersing agents can be used, including, for example, fatty acids having from 5 to 25 carbon atoms, metal salts composed of alkali metal or alkaline metal salts of such fatty acids, fatty acid esters, fatty acid amides, amines, quaternary ammonium salts, phosphates, borates, etc.

As the abrasive, for example, usable are known abrasives having a Mohs' hardness of 6 or more, which consist essentially of $\alpha$-alumina, $\beta$-alumina, fused alumina, silicon carbide, chromium oxide, cerium oxide, $\alpha$-iron oxide, corundum, diamond, silica stone, garnet, silicon nitride, boron nitride, molybdenum carbide, boron carbide, tungsten carbide, titanium oxide, etc. These can be used singly or as a combination of two or more of them. The abrasive for use in the present invention preferably has a mean particle size of from 0.01 to 2 µm. If desired, plural abrasives having different particle sizes may be used in combination, or a single abrasive having a broad particle size distribution may be used.

As the antistatic agent, are usable, in addition to the above-mentioned carbon black, known antistatic agents such as natural surfactants, nonionic surfactants, cationic surfactants, etc.

The material of the non-magnetic support for use in the present invention may be any known one that is generally used in ordinary magnetic recording media. For instance, usable are polyesters such as polyethylene terephthalate, polyethylene naphthalate, etc.; polyolefins such as polyethylene, polypropylene, etc.; cellulose derivatives such as cellulose triacetate, cellulose diacetate, cellulose acetate butyrate, etc.; vinyl resins such as polyvinyl chloride, polyvinylidene chloride, etc.; polycarbonates, polyimides, polyamidimides and other plastics; metals such as aluminium, copper, etc.; light alloys such as aluminium alloys, titanium alloys, etc.; ceramics, monocrystalline silicon, etc.

The magnetic recording medium of the present invention may optionally have an additional layer (subbing layer) consisting essentially of the above-mentioned known binders, between the non-magnetic support and the lower magnetic layer, for the purpose of elevating the adhesion strength between the support and the lower magnetic layer, etc.

The magnetic recording medium of the present invention may also have a non-magnetic back coat layer on the surface of the non-magnetic support opposite to the surface thereof coated with the magnetic layers, for example, for the purpose of improving the runnability of the medium and of preventing the medium from being electrically charged or being transferred. The thickness of the back coat layer is preferably from 0.1 to 2.0 µm, more preferably from 0.3 to 1.0 µm. The back coat layer may be made of any known one, for example a dispersion of carbon black in any of the above-mentioned binders. However, when the above-mentioned carbon black is incorporated into the lower magnetic layer, the back coat layer is unnecessary. The addition of the carbon black into the lower magnetic layer brings about the above-mentioned effects.

The carbon black that is optionally added to the magnetic layers, etc..may be any known one. For instance, usable is any of acetylene black, furnace black, coloring black, etc. In order to improve the handling of the components during the process of producing the magnetic recording medium of the present invention, granular carbon black may be employed. It is preferred to use granular carbon black having a mean particle size of from 10 to 1000 nm, preferably from 5 to 150 nm.

The solvent to be used for preparing the coating compositions for the magnetic layers (or non-magnetic layers) includes, for example, ketone solvents such as acetone, methyl ethyl ketone, methyl isobutyl ketone, cyclohexanone, etc.; ester solvents such as methyl acetate, ethyl acetate, butyl acetate, ethyl lactate, ethyl acetate monoethyl ether, etc.; glycol ether solvents such as glycol monoethyl ether, dioxane, etc.; aromatic hydrocarbon solvents such as benzene, toluene, xylene, etc.; chlorine-containing solvents such as methylene chloride, ethylene chloride, carbon tetrachloride, chloroform, ethylene chlorohydrin, dichlorobenzene, etc. In addition to these, any other known organic solvents can be used.

To prepare the magnetic coating compositions for use in the present invention, any known method can be employed. For instance, usable are a roll mill, a ball mill, a sand mill, a trommel mill, a high-speed stone mill, a basket mill, a disper, a homomixer, a kneader, a continuous kneader, an extruder, a homogenizer, an ultrasonic dispersing machine, etc.

To prepare the magnetic coating compositions, magnetic particles and other additive particles may be dispersed separately and the resulting dispersions may be mixed.

Prior to directly coating the magnetic coating compositions onto a non-magnetic support, a subbing layer comprising an adhesive, etc. may be coated on the support, or the support may be pre-treated by corona discharging, irradiation of electronic rays thereto, etc.

To coat the magnetic coating compositions onto the non-magnetic support, any known coating method can be employed, including, for example, air doctor coating, blade coating, rod coating, extrusion coating, air knife coating, squeezing, dipping, reverse roll coating, gravure coating, transfer roll coating, cast coating methods, etc. Any other methods than these can also be employed. If desired, plural layers may be coated at the same time by co-extrusion coating.

Figure 2:
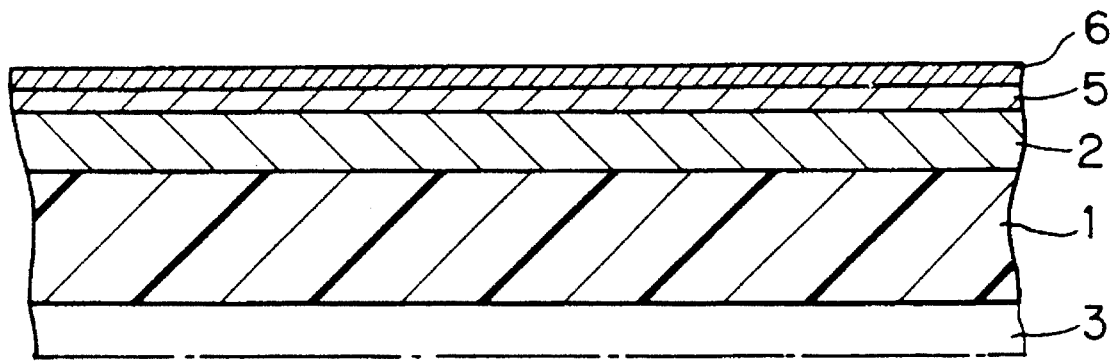
FIG. 2 is a cross-sectional view showing another embodiment of the magnetic recording medium of the present invention.

One embodiment of the magnetic recording medium of the present invention is shown in FIG. 1, in which the first magnetic layer 2 and the second magnetic layer 4 are laminated on the non-magnetic layer 1 in this order. The back coat layer 3, which is illustrated in FIG. 1 as a presumed line, may be provided on the surface of the support opposite to the surface thereof having the laminated layers thereon. However, the back coat layer 3 is not always necessary. An overcoat layer may be provided on the second magnetic layer. Another embodiment of the magnetic recording medium of the present invention is shown in FIG. 2, in which the upper layer is composed of the layers 5 and 6 having different compositions and different physical properties. For instance, the specific surface area of the magnetic powder in the layer 5 is different from that of the magnetic powder in the layer 6.

In the magnetic recording media illustrated in FIG. 1 and 2, the thickness of the first magnetic layer 2 is preferably from 1.5 to 4.0 μm (for example, 2.0 μm), while the thickness of the second magnetic layer 4 or the total thickness of the magnetic layers 5 and 6 is 2.0 μm or less (for example, 1.0 μm).

It is desirable that the plural magnetic layers (upper and lower magnetic layers) of the magnetic recording medium of the present invention are adjacent to each other. Between the two layers, either a definite boundary substantially exists or a boundary region comprising a mixture of the magnetic powders of the two layers and having a certain thickness exists. The upper and lower layers referred to herein are the substantial layers except the boundary region in the latter case. In particular, the medium of the present invention is advantageously prepared by a so-called wet-on-wet coating method where the plural magnetic layers are coated simultaneously while being wet. Needless-to-say, the medium of the present invention may also be prepared by a so-called wet-on-dry coating method where the upper layer is coated after drying the lower layer.

Examples of the present invention are mentioned below along with comparative examples, in which "parts" are by weight. These examples are not intended to restrict the scope of the present invention.

Examples 1 to 12, Comparative Examples 1 to 12

A magnetic coating composition for an upper magnetic layer, comprising the components mentioned below, was prepared.

Coating Liquid for Upper Magnetic Layer:

The following components were kneaded with a continuous kneader and then dispersed with a sand mill. To this, added were 4 parts of the following polyisocyanate and 1 part of myristic acid. The resulting mixture was filtered through a filter having a mean orifice diameter of 1 μm to obtain a magnetic coating liquid for an upper layer.

| | |
|---|---|
| Co-modified γ-Fe$_2$O$_3$ (having a specific surface area measured by a BET method of 45 m$^2$/g) | 100 parts |
| Nitrocellulose (NC-1/2H, trade name, produced by Asahi Chemical Co.) | 8 parts |
| Vinyl chloride-vinyl acetate-vinyl alcohol copolymer (Vinylite VAGH, trade name, produced by U.C.C. Co.) | 6 parts |
| Polyurethane resin (N-2304, trade name, produced by Nippon Polyurethane Co.) | 8 parts |
| α-Al$_2$O$_3$ (AKP-30, trade name, produced by Sumitomo Chemical Co.) | 3 parts |
| Polyisocyanate (Colonate L, trade name, produced by Nippon Polyurethane Co.) | 4 parts |
| Myristic acid | 1 part |
| Butyl stearate | 1 part |
| Methyl ethyl ketone | 80 parts |
| Methyl isobutyl ketone | 80 parts |
| Toluene | 80 parts |

Coating Liquid for Lower Magnetic Layer:

The binder shown in Table 1 below was used. The components mentioned below were kneaded with a continuous kneader and then dispersed with a sand mill. To this, added were 4 parts of the following polyisocyanate and 1 part of myristic acid. The resulting mixture was filtered through a filter having a mean orifice diameter of 1 μm to obtain a magnetic coating liquid for a lower layer.

| | |
|---|---|
| Co-modified γ-Fe$_2$O$_3$ (having a specific surface area measured by a BET method of 30 m$^2$/g) | 100 parts |
| Binder (see Table 1 below) | 20 parts |
| Carbon black (BP-1, trade name, produced by Cabot Co.) | 10 parts |
| Polyisocyanate (Colonate L, trade name, produced by Nippon Polyurethane Co.) | 4 parts |
| Myristic acid | 1 part |
| Butyl stearate | 1 part |
| Methyl ethyl ketone | 80 parts |
| Methyl isobutyl ketone | 80 parts |
| Toluene | 80 parts |

The above-mentioned coating liquid for a lower magnetic layer was coated on a polyethylene terephthalate film having a thickness of 14 μm by extrusion, at a thickness of 2.0 μm, dried, cured and calendered. The characteristics of the single lower layer thus formed were measured.

Both the coating liquid for an upper magnetic layer and the coating liquid for a lower magnetic layer mentioned above were coated on a polyethylene terephthalate film having a thickness of 14 μm, according to a wet-on-wet coating method using a co-extrusion coater, at a thickness of 1.0 μm for the upper layer and a thickness of 2.0 μm for the lower layer, and then processed in the same manner as above. The wide magnetic film thus formed was cut into a width of ½ inch to obtain a video tape.

These video tapes of Examples 1 to 12 and Comparative Examples 1 to 12 thus produced according to the process mentioned above were assessed with respect to the dispersibility and the coatability of the single-layer-coated tapes, to the coatability of the upper and lower layers coated by co-extrusion coating and also to the video electromagnetic conversion characteristics of the tapes. The measurement of the characteristics of the video tapes was conducted by the methods mentioned below. The results obtained are shown in Table 2 below.

1. Dispersibility:

After the coating liquid for the lower magnetic layer was coated and dried on the polyethylene terephthalate film (thickness: 14.0 μm), the gloss of the coated surface was measured with a digital angle-varying glossmeter VG-1D (produced by Nippon Denshoku Kogyo KK) at an incident angle of 45°. The dispersibility of the coating liquid was evaluated as follows, according to the gloss thus measured.

○: gloss of 120% or more

Δ: gloss of from 100% to less than 120% x: gloss of less than 100%

2. Coatability:

The coated surface of each of the single-layered video tapes and the double-layer-coated video tapes was observed with an optical microscope (differential interference) at five magnifications, from which the coatability of the coating liquid was evaluated as follows.

○: No streak was found.

Δ: Some streaks were found.

x : Large flaws were found all over the surface with the naked eye.

3. RF-OUT (video output power):

Video signals were recorded on each video tape, using VTR AG-6200 (produced by Matsushita Electric Co.). The reproduction level of the thus-recorded tape was obtained as a relative value with reference to a standard tape VRT-2 (produced by JVC Co.) having 0 dB.

4. Y-S/N (video S/N):

The S/N ratio of the video signals recorded on each video tape was obtained as a relative value with reference to said standard tape having 0 dB.

5. C-OUT (chroma output power):

Chroma signals were recorded on each video tape, which were then reproduced. The reproduction level of each tape was obtained as a relative value with reference to said standard tape having 0 dB.

6. C-S/N (chroma S/N):

The S/N ratio of the chroma signals recorded on each video tape was obtained as a relative value with reference to said standard tape having 0 dB.

TABLE 1

| | Binder in Lower Magnetic Layer | Molecular Weight (Mn) | Tg (°C.) | Polar Group Kind | Polar Group Amount (mmol/g) |
|---|---|---|---|---|---|
| Example 1 | Polyurethane resin | 20,000 | 30.0 | $-N(C_2H_5)_2$* | 0.1 |
| Example 2 | Polyurethane resin | 20,000 | 30.0 | $-N(C_2H_5)_2$* | 0.2 |
| Example 3 | Polyurethane resin (with no curing agent) | 20,000 | 30.0 | $-N(C_2H_5)_2$* | 0.2 |
| Example 4 | Polyurethane resin | 20,000 | 30.0 | $-N(C_2H_5)_2$* | 0.03 |
| Example 5 | Polyurethane resin | 20,000 | 30.0 | $-N(C_2H_5)_2$* | 1.2 |
| Example 6 | Polyurethane resin | 60,000 | 70.0 | $-N(C_2H_5)_2$* | 0.2 |
| Example 7 | Polyurethane resin | 24,000 | 70.0 | $-N(C_2H_5)_2$* | 0.2 |
| Example 8 | Polyurethane resin | 24,000 | −20.0 | $-N(C_2H_5)_2$* | 0.2 |
| Example 9 | Polyurethane resin | 20,000 | 30.0 | $-N(C_2H_5)_2$* | 0.0001 |
| Example 10 | Polyurethane resin | 20,000 | 30.0 | $-N(C_2H_5)_2$* | 10 |
| Example 11 | Polyurethane resin | 20,000 | 30.0 | $-N(C_2H_5)_2$* | 0.00001 |
| Example 12 | Polyurethane resin | 20,000 | 30.0 | $-N(C_2H_5)_2$* | 100 |
| Comparative Example 1 | Vinyl chloride-vinyl acetate copolymer | 10,000 | 70.0 | $-OSO_3K$ | 0.08 |
| Comparative Example 2 | Vinyl chloride-vinyl acetate copolymer | 28,000 | 75.0 | secondary OH | 1.4 |
| Comparative Example 3 | Polyurethane resin | 31,000 | 5.0 | $-COOH$ | 0.05 |
| Comparative Example 4 | Polyurethane resin | 28,000 | 35.0 | $-COOH$ | 0.2 |
| Comparative Example 5 | Polyurethane resin | 22,000 | 76.0 | $-SO_3Na$ | 0.08 |
| Comparative Example 6 | Polyurethane resin | 20,000 | 30.0 | $-NH_2$ | 0.1 |
| Comparative Example 7 | Polyurethane resin | 20,000 | 30.0 | $-NH(C_2H_5)$ | 0.1 |
| Comparative Example 8 | Mixture (3/7) of binder of Comparative Example 1 and that of Comparative Example 3 | | | | |
| Comparative Example 9 | Mixture (3/7) of binder of Comparative Example 1 and that of Comparative Example 5 | | | | |
| Comparative Example 10 | Mixture (3/7) of binder of Comparative Example 1 and that of Example 2 | | | | |
| Comparative Example 11 | Mixture (3/7) of binder of Comparative Example 2 and that of Example 2 | | | | |
| Comparative Example 12 | Single magnetic layer (thickness: 3.0 μm) having the same composition as that of the upper layer in Example 1 | | | | |

(*) Polyurethane resins having this tertiary amine (tert-amine-polyurethane resins) are produced according to the process mentioned below.

TABLE 1-continued

| | Binder in Lower Magnetic Layer | Molecular Weight (Mn) | Tg (°C.) | Polar Group Kind | Amount (mmol/g) |
|---|---|---|---|---|---|

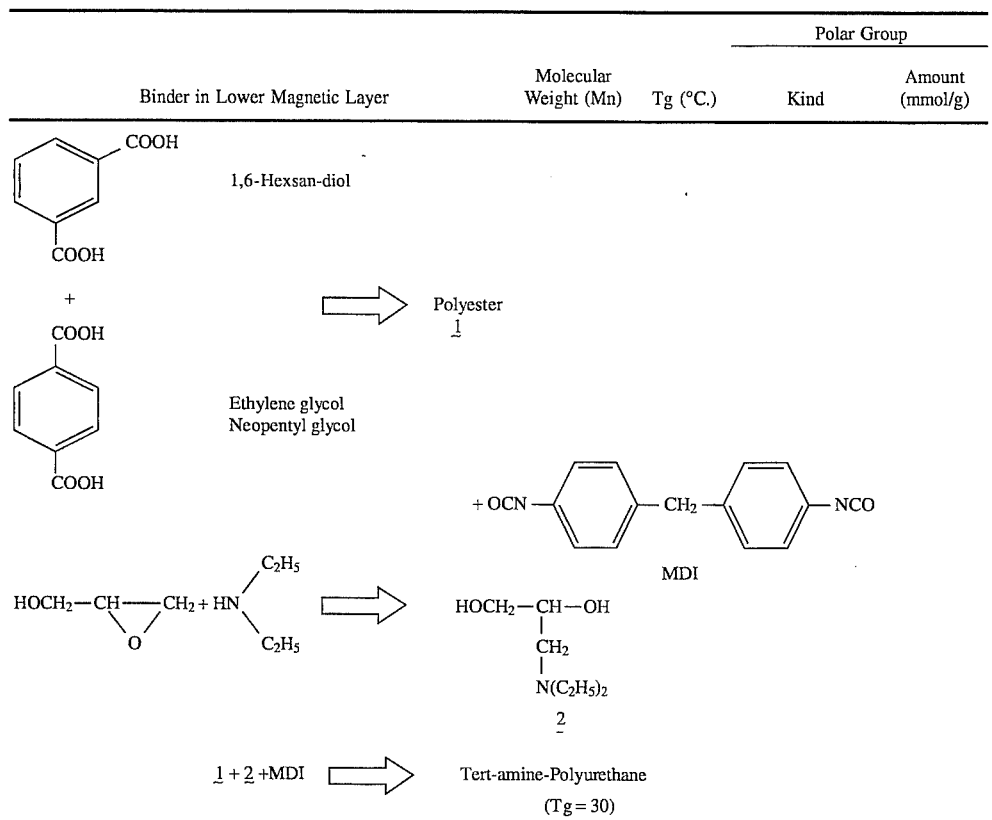

TABLE 2

| | | Characteristics of Single-layer-coated Tape (single lower layer: 2.0 μm) | | Characteristics of Double-layer-coated Tape (1.0 μm upper layer + 2.0 μm lower layer) | | | | |
|---|---|---|---|---|---|---|---|---|
| | Binder | Dispersibility | Coatability | Coatability | RF-OUT (dB) | Y-S/N (dB) | C-OUT (dB) | C-S/N (dB) |
| Example 1 | Tert-amine-polyurethane resin | ○ | ○ | ○ | 3.0 | 2.5 | 3.0 | 2.5 |
| Example 2 | Tert-amine-polyurethane resin | ○ | ○ | ○ | 2.9 | 2.5 | 2.9 | 2.4 |
| Example 3 | Tert-amine-polyurethane resin (with no curing agent) | ○ | ○ | ○ | 3.0 | 2.6 | 2.9 | 2.5 |
| Example 4 | Tert-amine-polyurethane resin | ○ | ○ | ○ | 2.9 | 2.4 | 3.0 | 2.4 |
| Example 5 | Tert-amine-polyurethane resin | ○ | ○ | Δ | 2.8 | 2.3 | 2.8 | 2.2 |
| Example 6 | Tert-amine-polyurethane resin | ○ | ○ | ○ | 2.9 | 2.4 | 2.9 | 2.4 |
| Example 7 | Tert-amine-polyurethane resin | ○ | ○ | ○ | 3.0 | 2.5 | 2.9 | 2.5 |
| Example 8 | Tert-amine-polyurethane resin | ○ | ○ | ○ | 3.1 | 2.6 | 2.9 | 2.5 |
| Example 9 | Tert-amine-polyurethane resin | Δ | ○ | ○ | 2.7 | 2.5 | 2.9 | 2.3 |
| Example 10 | Tert amine-polyurethane resin | ○ | ○ | Δ | 3.0 | 2.4 | 3.0 | 2.2 |
| Example 11 | Tert-amine-polyurethane resin | Δ | ○ | ○ | 2.7 | 2.4 | 2.9 | 2.2 |
| Example 12 | Tert-amine-polyurethane resin | ○ | Δ | Δ | 3.0 | 2.4 | 2.9 | 2.3 |
| Comparative Example 1 | Vinyl chloride-vinyl acetate copolymer | ○ | Δ | X | 1.8 | 2.0 | 2.9 | 1.2 |
| Comparative Example 2 | Vinyl chloride-vinyl acetate copolymer | Δ | X | X | 1.3 | 1.8 | 3.0 | 0.8 |
| Comparative Example 3 | Polyurethane resin | Δ | Δ | X | 1.4 | 1.7 | 2.8 | 0.9 |
| Comparative Example 4 | Polyurethane resin | ○ | Δ | X | 2.0 | 2.0 | 2.9 | 1.5 |
| Comparative Example 5 | Polyurethane resin | ○ | X | X | 1.8 | 1.9 | 2.8 | 1.3 |
| Comparative Example 6 | Primary-amine-polyurethane resin | ○ | Δ | X | 2.0 | 1.8 | 2.7 | 1.4 |
| Comparative Example 7 | Secondary-amine-polyurethane resin | ○ | ○ | Δ | 2.1 | 2.1 | 2.8 | 1.5 |
| Comparative Example 8 | Mixture of vinyl chloride-based copolymer and polyurethane resin | ○ | Δ | Δ | 2.1 | 2.1 | 2.9 | 1.6 |
| Comparative | Mixture of vinyl chloride- | ○ | Δ | X | 1.7 | 1.8 | 2.8 | 1.2 |

TABLE 2-continued

| | | Characteristics of Single-layer-coated Tape | | Characteristics of Double-layer-coated Tape (1.0 μm upper layer + 2.0 μm lower layer) | | | |
|---|---|---|---|---|---|---|---|
| | | (single lower layer: 2.0 μm) | | | RF-OUT | Y-S/N | C-OUT | C-S/N |
| | Binder | Dispersibility | Coatability | Coatability | (dB) | (dB) | (dB) | (dB) |
| Example 9 Comparative Example 10 | copolymer and polyurethane resin Mixture of vinyl chloride-based copolymer and polyurethane resin | X | X | X | 1.0 | 1.5 | 2.7 | 0.5 |
| Comparative Example 11 | Mixture of vinyl chloride-based copolymer and polyurethane resin | Δ | Δ | X | 1.5 | 1.6 | 2.8 | 1.0 |
| Comparative Example 12 | Mixture of nitrocellulose, vinyl chloride-based copolymer and polyurethane resin (single-layer-coated) | Δ | Δ | Δ (single-layer-coated) | 2.5 | 2.1 | 2.8 | 2.0 |

As is obvious from Table 2 above, the dispersibility and the coatability of the lower magnetic layers containing, as the binder, only the tert-amine-polyurethane resin according to the present invention were much better than those of the lower magnetic layers containing a single binder other than said resin or a mixture comprising a binder other than said resin. However, the coatability of the coating compositions containing, as the binder, only the tert-amine-polyurethane resin having too large amount of polar groups was often bad in co-extrusion coating to coat two layers, whilst the dispersibility of the coating compositions containing, as the binder, only the tert-amine-polyurethane resin having too small amount of polar groups was often bad.

The coatability of the coating compositions containing, as the binder, a mixture of a vinyl chloride-vinyl acetate copolymer and a polyurethane resin having polar groups other than tertiary amines was somewhat improved but was insufficient. The mixed binder comprising a tert-amine-polyurethane resin and a vinyl chloride-vinyl acetate copolymer often noticeably worsened the dispersibility of the coating compositions containing it, depending on the polar groups in the vinyl chloride-vinyl acetate copolymer. For these reasons, it is extremely effective to use, as the binder, only the tert-amine-polyurethane resin according to the present invention. It is known that the poor dispersibility of the magnetic coating compositions results in the decrease in the video output power and that the poor coatability of them results in the increase in the streaks in the coated layer and therefore the decrease in the chroma S/N.

From the above-mentioned results, it is known that the coatability and the dispersibility of the coating composition for the lower layer containing, as the binder, the tert-amine-polyurethane resin according to the present invention are much improved, whereby the characteristics, such as video characteristics, etc., of the magnetic recording medium having the lower layer of said composition are improved. The characteristics of the double-layer-coated media of the present invention are much improved, as compared with those of single-layer-coated media.

The above-mentioned effects were attained even when no curing agent was added to the binder in the lower layer.

Examples 13 to 28, Comparative Examples 13 to 18

A magnetic coating composition for an upper magnetic layer, comprising the components mentioned below, was prepared.

Coating Liquid for Upper Magnetic Layer:

The following components were kneaded with a continuous kneader and then dispersed with a sand mill. To this, added were 4 parts of the following polyisocyanate and 1 part of myristic acid. The resulting mixture was filtered through a filter having a mean orifice diameter of 1 μm to obtain a magnetic coating liquid for an upper layer.

| | |
|---|---|
| Co-modified γ-$Fe_2O_3$ (having a specific surface area measured by a BET method of 45 $m^2/g$) | 100 parts |
| Nitrocellulose (NC-½, trade name, produced by Asahi Chemical Co.) | 8 parts |
| Vinyl chloride-vinyl acetate-vinyl alcohol copolymer (Vinylite VAGH, trade name, produced by U.C.C. Co.) | 6 parts |
| Polyurethane resin (N-2304, trade name, produced by Nippon Polyurethane Co.) | 8 parts |
| α-$Al_2O_3$ (AKP-30, trade name, produced by Sumitomo Chemical Co.) | 3 parts |
| Polyisocyanate (Colonate L, trade name, produced by Nippon Polyurethane Co.) | 4 parts |
| Myristic acid | 1 part |
| Butyl stearate | 1 part |
| Methyl ethyl ketone | 80 parts |
| Methyl isobutyl ketone | 80 parts |
| Toluene | 80 parts |

Coating Liquid for Lower Magnetic Layer:

The binder shown in Table 3 below was used. The components mentioned below were kneaded with a continuous kneader and then dispersed with a sand mill. To this, added were 4 parts of the following polyisocyanate and 1 part of myristic acid. The resulting mixture was filtered through a filter having a mean orifice diameter of 1 μm to obtain a magnetic coating liquid for a lower layer.

| | |
|---|---|
| Co-modified γ-$Fe_2O_3$ (having a specific surface area measured by a BET method of 30 $m^2/g$) | 100 parts |
| Binder (see Table 3 below) | 20 parts |
| Carbon black (BP-1, trade name, produced by Cabot Co.) | 10 parts |
| Polyisocyanate (curing agent) (Colonate L, trade name, produced by Nippon Polyurethane Co.) | See Table 3 below |
| Myristic acid | 1 part |
| Butyl stearate | 1 part |
| Methyl ethyl ketone | 80 parts |
| Methyl isobutyl ketone | 80 parts |
| Toluene | 80 parts |

The above-mentioned coating liquid for a lower magnetic layer was coated on a polyethylene terephthalate film having a thickness of 14 μm by extrusion, at a thickness of 2.0 μm, dried, cured and calendered. The characteristics of the single lower layer thus formed were measured.

Both the coating liquid for an upper magnetic layer and the coating liquid for a lower magnetic layer mentioned above were coated on a polyethylene terephthalate film having a thickness of 14 μm, according to a wet-on-wet coating method using a co-extrusion coater, at a thickness of 1.0 μm for the upper layer and a thickness of 2.0 μm for the lower layer, and then processed in the same manner as above. The wide magnetic film thus formed was cut into a width of ½ inch to obtain a video tape.

These video tapes of Examples 13 to 28 and Comparative Examples 13 to 18 thus produced according to the process mentioned above were assessed with respect to the dispersibility and the coatability of the single-layer-coated tapes, to the coatability of the upper and lower layers coated by co-extrusion coating and also to the video electromagnetic conversion characteristics and the increase in the amount of dropout of the tapes. The measurement of the characteristics of the video tapes was conducted by the methods mentioned above, except for the measurement of the increase in dropout (increase in D/O) which will be mentioned below. The results obtained are shown in Table 4 below.

Increase in Dropout (D/O) after Stored:

501RE signal was recorded on each video tape, using the above-mentioned VTR, and dropout at −20 dB/15 μs was measured. The thus-recorded tapes were stored at 45° C. and 80% RH for 3 days, and their dropout was again measured under the same condition. The increase in dropout is shown in Table 4 below, as follows.

○: increase of less than 5%

Δ: increase of from 5% to 30% x: increase of more than 30%

TABLE 3

| | Polyurethane Resin Binder | | | | Polyvinyl Chloride Binder | | | | |
|---|---|---|---|---|---|---|---|---|---|
| | Polar Group | Amount of Polar Group (mmol/g) | Molecular Weight (Mn) | Amount of Binder Added (parts) | Polar Group | Amount of Polar Group (mmol/g) | Molecular Weight (Mn) | Amount of Binder Added (parts) | Curing Agent (amount added, parts) |
| Example 13 | $-N(C_2H_5)_2$* | 0.1 | 20,000 | 12.0 | $-N(CH_3)_2$ | 0.5 | 32,000 | 8.0 | 0.0 |
| Example 14 | $-N(C_2H_5)_2$* | 0.1 | 20,000 | 12.0 | $-N(CH_3)_2$** | 0.5 | 32,000 | 8.0 | 2.0 |
| Example 15 | $-N(C_2H_5)_2$* | 0.1 | 20,000 | 12.0 | $-N(CH_3)_2$** | 0.5 | 32,000 | 8.0 | 4.0 |
| Example 16 | $-N(C_2H_5)_2$* | 0.2 | 20,000 | 12.0 | $-N(CH_3)_2$** | 0.5 | 32,000 | 8.0 | 2.0 |
| Example 17 | $-N(C_2H_5)_2$* | 0.2 | 60,000 | 12.0 | $-N(CH_3)_2$** | 0.5 | 32,000 | 8.0 | 2.0 |
| Example 18 | $-N(C_2H_5)_2$* | 0.2 | 60,000 | 15.0 | $-N(CH_3)_2$** | 0.5 | 17,000 | 5.0 | 2.0 |
| Example 19 | $-N(C_2H_5)_2$* | 0.2 | 60,000 | 15.0 | $-N(CH_3)_2$** | 0.5 | 10,000 | 5.0 | 2.0 |
| Example 20 | $-N(C_2H_5)_2$* | 0.1 | 20,000 | 12.0 | $-N(CH_3)_2$** | 0.001 | 32,000 | 8.0 | 2.0 |
| Example 21 | $-N(C_2H_5)_2$* | 0.1 | 20,000 | 12.0 | $-N(CH_3)_2$** | 1.0 | 32,000 | 8.0 | 2.0 |
| Example 22 | $-N(C_2H_5)_2$* | 0.1 | 20,000 | 12.0 | $-N(CH_3)_2$** | 0.0001 | 32,000 | 8.0 | 2.0 |
| Example 23 | $-N(C_2H_5)_2$* | 0.1 | 20,000 | 12.0 | $-N(CH_3)_2$** | 10 | 32,000 | 8.0 | 2.0 |
| Example 24 | $-N(C_2H_5)_2$* | 0.1 | 20,000 | 10.0 | $-N(CH_3)_2$** | 0.5 | 32,000 | 10.0 | 2.0 |
| Example 25 | $-N(C_2H_5)_2$* | 0.1 | 20,000 | 8.0 | $-N(CH_3)_2$** | 0.5 | 32,000 | 12.0 | 2.0 |
| Example 26 | $-N(C_2H_5)_2$* | 0.1 | 20,000 | 12.0 | $-NH_2$ | 0.5 | 32,000 | 8.0 | 2.0 |
| Example 27 | $-N(C_2H_5)_2$* | 0.1 | 20,000 | 12.0 | $-NH(CH_3)$ | 0.5 | 32,000 | 8.0 | 2.0 |
| Example 28 | $-N(C_2H_5)_2$* | 0.1 | 20,000 | 20.0 | — | — | — | — | 2.0 |
| Comparative Example 13 | — | — | — | — | $-N(CH_3)_2$** | 0.5 | 32,000 | 8.0 | 2.0 |
| Comparative Example 14 | $-N(C_2H_5)_2$* | 0.1 | 20,000 | 12.0 | $-OSO_3K$ | 0.07 | 10,000 | 8.0 | 2.0 |
| Comparative Example 15 | $-N(C_2H_5)_2$* | 0.1 | 20,000 | 12.0 | secondary OH | 1.35 | 34,000 | 8.0 | 2.0 |
| Comparative Example 16 | $-SO_3Na$ | 0.04 | 30,000 | 12.0 | $-OSO_3K$ | 0.07 | 10,000 | 8.0 | 2.0 |
| Comparative Example 17 | $-COOH$ | 0.05 | 30,000 | 12.0 | secondary OH | 1.35 | 34,000 | 8.0 | 2.0 |
| Comparative Example 18 | $-SO_3Na$ | 0.04 | 30,000 | 12.0 | $-N(CH_3)_2$** | 0.5 | 32,000 | 8.0 | 2.0 |

(*) This tert-amine-polyurethane resin was produced in the same manner as mentioned above.
(**) This tert-amine-PVC was produced according to the process mentioned below.

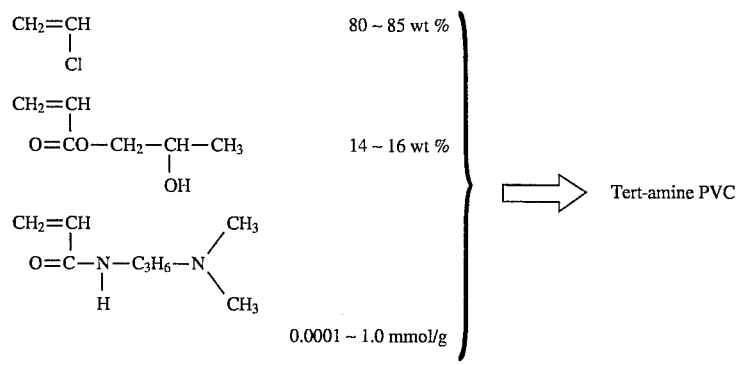

TABLE 4

| | | Characteristics of Single-layer-coated Tape (single lower layer: 2.0 μm) | | | Characteristics of Double-layer-coated Tape (1.0 μm upper layer + 2.0 μm lower layer) | | | | | |
|---|---|---|---|---|---|---|---|---|---|---|
| | Binder | Amount of Curing Agent Added (part) | Dispersibility | Coatability | Coatability | RF-OUT (dB) | Y-S/N (dB) | C-OUT (dB) | C-S/N (dB) | Increase in D/O |
| Example 13 | Tert-amine-polyurethane resin + amine-modified PVC resin | 0.0 | ○ | ○ | ○ | 3.1 | 2.6 | 3.0 | 2.6 | ○ |
| Example 14 | Tert-amine-polyurethane resin + amine-modified PVC resin | 2.0 | ○ | ○ | ○ | 3.0 | 2.6 | 2.9 | 2.5 | ○ |
| Example 15 | Tert-amine-polyurethane resin + amine-modified PVC resin | 4.0 | ○ | ○ | ○ | 2.9 | 2.5 | 2.9 | 2.4 | ○ |
| Example 16 | Tert-amine-polyurethane resin + amine-modified PVC resin | 2.0 | ○ | ○ | ○ | 3.0 | 2.5 | 3.0 | 2.4 | ○ |
| Example 17 | Tert-amine-polyurethane resin + amine-modified PVC resin | 2.0 | ○ | ○ | ○ | 2.9 | 2.4 | 2.8 | 2.4 | ○ |
| Example 18 | Tert-amine-polyurethane resin + amine-modified PVC resin | 2.0 | ○ | ○ | ○ | 2.9 | 2.4 | 2.9 | 2.4 | ○ |
| Example 19 | Tert-amine-polyurethane resin + amine-modified PVC resin | 2.0 | ○ | ○ | ○ | 3.0 | 2.5 | 2.9 | 2.5 | ○ |
| Example 20 | Tert-amine-polyurethane resin + amine-modified PVC resin | 2.0 | Δ | ○ | ○ | 2.8 | 2.4 | 2.8 | 2.3 | ○ |
| Example 21 | Tert-amine-polyurethane resin + amine-modified PVC resin | 2.0 | Δ | ○ | ○ | 2.8 | 2.3 | 2.8 | 2.3 | ○ |
| Example 22 | Tert-amine-polyurethane resin + amine-modified PVC resin | 2.0 | Δ | ○ | ○ | 2.7 | 2.2 | 2.8 | 2.3 | ○ |
| Example 23 | Tert-amine-polyurethane resin + amine-modified PVC resin | 2.0 | Δ | Δ | Δ | 2.7 | 2.2 | 2.8 | 2.2 | ○ |
| Example 24 | Tert-amine-polyurethane resin + amine-modified PVC resin | 2.0 | ○ | ○ | ○ | 3.0 | 2.5 | 3.0 | 2.4 | ○ |
| Example 25 | Tert-amine-polyurethane resin + amine-modified PVC resin | 2.0 | ○ | ○ | Δ | 2.9 | 2.4 | 3.0 | 2.3 | ○ |
| Example 26 | Tert-amine-polyurethane resin + amine-modified | 2.0 | ○ | ○ | ○ | 2.9 | 2.5 | 3.0 | 2.5 | ○ |

TABLE 4-continued

| | | Characteristics of Single-layer-coated Tape (single lower layer: 2.0 μm) | | | Characteristics of Double-layer-coated Tape (1.0 μm upper layer + 2.0 μm lower layer) | | | | | |
|---|---|---|---|---|---|---|---|---|---|---|
| | Binder | Amount of Curing Agent Added (part) | Dispersibility | Coatability | Coatability | RF-OUT (dB) | Y-S/N (dB) | C-OUT (dB) | C-S/N (dB) | Increase in D/O |
| Example 27 | PVC resin Tert-amine-polyurethane resin + amine-modified PVC resin | 2.0 | ○ | ○ | ○ | 3.0 | 2.5 | 2.9 | 2.5 | ○ |
| Example 28 | Tert-amine-polyurethane resin only | 2.0 | ○ | ○ | ○ | 3.0 | 2.5 | 3.0 | 2.5 | Δ |
| Comparative Example 13 | Amine-modified PVC resin only | 2.0 | ○ | ○ | Δ | 2.5 | 2.2 | 2.9 | 2.0 | ○ |
| Comparative Example 14 | Mixture of tert-amine-polyurethane resin and modified PVC resin | 2.0 | X | X | X | 1.0 | 1.5 | 2.7 | 0.5 | X |
| Comparative Example 15 | Mixture of tert-amine-polyurethane resin and modified PVC resin | 2.0 | Δ | Δ | X | 1.5 | 1.6 | 2.8 | 1.0 | X |
| Comparative Example 16 | Mixture of modified polyurethane resin and modified PVC resin | 2.0 | ○ | Δ | X | 1.8 | 1.9 | 2.8 | 1.3 | Δ |
| Comparative Example 17 | Mixture of modified polyurethane resin and modified PVC resin | 2.0 | ○ | Δ | X | 1.6 | 1.7 | 2.9 | 1.1 | Δ |
| Comparative Example 18 | Mixture of modified polyurethane resin and amine-modified PVC resin | 2.0 | Δ | Δ | X | 1.5 | 1.4 | 2.7 | 1.0 | ○ |

As is obvious from Table 4 above, the dispersibility and the coatability of the lower magnetic layers containing, as the binder, a mixed system comprising a tert-amine-polyurethane resin and an amine-modified vinyl chloride-based copolymer resin according to the present invention were much better than those of the lower magnetic layers containing a single binder other than said mixed system or a mixture comprising a binder other than said mixed system. According to the present invention, it is desirable that the amount of the polar group in each resin and the ratio of the two resins in the mixed system are suitably selected.

The dispersibility of the magnetic coating compositions containing, as the binder, only an amine-modified vinyl chloride-based copolymer was good, but the coatability of them was worse than that of the magnetic coating compositions containing, as the same, only a tert-amine-polyurethane resin. On the other hand, the dispersibility of the magnetic coating compositions containing a mixed binder comprising a tert-amine-polyurethane resin and a vinyl chloride-based copolymer was often worsened, depending on the kind of the polar group in the vinyl chloride-based copolymer, whilst the dispersibility of the magnetic coating compositions containing a mixed binder comprising a tert-amine-polyurethane resin and an amine-modified vinyl chloride-based copolymer was not worsened and the coatability of them was good.

The rigidity of the lower layer containing a mixed binder comprising a tert-amine-polyurethane resin and an amine-modified polyvinyl chloride-based copolymer resin, according to the present invention, was improved. Accordingly, it is known that the contact between the magnetic recording medium having the lower magnetic layer of the present invention and a head with which the medium is kept in contact is improved with the result that the electromagnetic conversion characteristics of the medium are kept good. In addition, it is known that, since the crosslinking of the components constituting the lower magnetic layer has been improved, the dropout of the medium having the lower magnetic layer is not almost increased even after the medium has been stored. It is also known that, if the dispersibility of magnetic coating compositions is worsened, the video output power of the medium having a lower magnetic layer made of the composition is lowered, and if the coatability of magnetic coating compositions is bad to give many streaks on the coated layers, the chroma S/N of the medium having a lower magnetic layer made of the composition is decreased.

From the above-mentioned results, it is known that the coatability of the coating composition for the lower layer containing a mixed binder comprising a tert-amine-polyurethane resin and an amine-modified vinyl chloride-based copolymer resin, according to the present invention, is improved without worsening the dispersibility of the composition, whereby the characteristics, such as video characteristics, etc., of the magnetic recording medium having the lower layer of said composition are improved without increasing dropout of the medium. The characteristics of the double-layer-coated media of the present invention are much improved, as compared with those of single-layer-coated media.

The above-mentioned effects were attained even when the mixed binder in the lower layer contained any of amine-modified vinyl chloride homopolymers in place of or in addition to the above-mentioned amine-modified vinyl chloride-based copolymer.

Examples 29 to 61

A magnetic coating composition for an upper magnetic layer, comprising the components mentioned below, was prepared.

Coating Liquid for Upper Magnetic Layer:

The following components were kneaded with a continuous kneader and then dispersed with a sand mill. To this, added were 4 parts of the following polyisocyanate and 1 part of myristic acid. The resulting mixture was filtered through a filter having a mean orifice diameter of 1 μm to obtain a magnetic coating liquid for an upper layer.

| | |
|---|---|
| Co-modified $\gamma$-$Fe_2O_3$ (having a specific surface area measured by a BET method of 45 $m^2/g$ and having Hc of 700 Oe) | 100 parts |
| Nitrocellulose (NC-½, trade name, produced by Asahi Chemical Co.) | 8 parts |
| Potassium sulfonate-containing vinyl chloride-based copolymer (MR-110, trade name, produced by Nippon Zeon Co.) | 6 parts |
| Polyurethane resin (N-2304, trade name, produced by Nippon Polyurethane Co.) | 8 parts |
| $\alpha$-$Al_2O_3$ (HIT-50, trade name, produced by Sumitomo Chemical Co.) | 2 parts |
| $Cr_2O_3$ (Chromex S-1, trade name, produced by Nippon Chemical Industry Co.) | 2 parts |
| Polyisocyanate (Colonate L, trade name, produced by Nippon Polyurethane Co.) | 4 parts |
| Myristic acid | 1 part |
| Butyl stearate | 1 part |
| Methyl ethyl ketone | 80 parts |
| Methyl isobutyl ketone | 80 parts |
| Toluene | 80 parts |

Coating Liquid A for Lower Magnetic Layer:

The components mentioned below were kneaded with a continuous kneader and then dispersed with a sand mill. To this, added were 4 parts of polyisocyanate and 1 part of myristic acid. The resulting mixture was filtered through a filter having a mean orifice diameter of 1 μm to obtain a magnetic coating liquid A for a lower layer.

| | |
|---|---|
| Co-modified $Fe_3O_4$ (having a specific surface area measured by a BET method of 30 $m^2/g$ and having Hc of 600 Oe) | 100 parts |
| Tertiary amine-containing polyester urethane resin (Mn = 20,000, Tg = 30° C., —$N(C_2H_5)_2$ content = 0.2 mmol/g) | 20 parts |
| Carbon black (see Table 5 below) | See Table 5 below |
| Polyisocyanate (Colonate L, trade name, produced by Nippon Polyurethane Co.) | 4 parts |
| Myristic acid | 1 part |
| Butyl stearate | 1 part |
| Methyl ethyl ketone | 80 parts |
| Methyl isobutyl ketone | 80 parts |
| Toluene | 80 parts |

Coating Liquid B for Lower Magnetic Layer:

The components mentioned below were kneaded with a continuous kneader and then dispersed with a sand mill. To this, added were 4 parts of polyisocyanate and 1 part of myristic acid. The resulting mixture was filtered through a filter having a mean orifice diameter of 1 μm to obtain a magnetic coating liquid B for a lower layer.

| | |
|---|---|
| Co-modified $Fe_3O_4$ (having a specific surface area measured by a BET method of 30 $m^2/g$ and having Hc of 600 Oe)) | 100 parts |
| Tertiary amine-containing polyester urethane resin (Mn = 20,000, Tg = 30° C., —$N(C_2H_5)_2$ content = 0.2 mmol/g) | 12 parts |
| Amine-modified polyvinyl chloride resin (Mn = 32,000, —$N(CH_3)_2$ content = 0.3 mmol/g) | 8 parts |
| Carbon black (see Table 5 below) | See Table 5 below |
| Polyisocyanate (Colonate L, trade name, produced by Nippon Polyurethane Co.) | 4 parts |
| Myristic acid | 1 part |
| Butyl stearate | 1 part |
| Methyl ethyl ketone | 80 parts |
| Methyl isobutyl ketone | 80 parts |
| Toluene | 80 parts |

The above-mentioned coating liquid for a lower magnetic layer was coated on a polyethylene terephthalate film having a thickness of 14 μm by extrusion, at a thickness of 2.0 μm, dried, cured and calendered. The characteristics of the single lower layer thus formed were measured.

Both the coating liquid for an upper magnetic layer and the coating liquid for a lower magnetic layer mentioned above were coated on a polyethylene terephthalate film having a thickness of 14 μm, according to a wet-on-wet coating method using a co-extrusion coater, at a thickness of 1.2 μm for the upper layer and a thickness of 1.8 μm for the lower layer, and then processed in the same manner as above. The wide magnetic film thus formed was cut into a width of ½ inch to obtain a video tape.

These video tapes of Examples 29 to 61 thus produced according to the process mentioned above were assessed with respect to the dispersibility and Br of the single-layer-coated tapes and also to the video electromagnetic conversion characteristics, the electric resistance, the light transmittance and the running durability of the double-layer-coated tapes. The measurement of the characteristics of the video tapes was conducted by the methods mentioned above, except for the measurement of the following matters. The results obtained are shown in Table 6 below.

1. RF-OUT (video output power):

Video signals were recorded on each video tape, using VTR BR-7700 (produced by JVC Co.). The reproduction level of the thus-recorded tape was obtained as a relative value with reference to the tape of Example 3, as the standard tape, having 0 dB.

2. Surface Electric Resistivity:

Each video tape sample was cut into a size of ½ inch×½ inch, and its surface electric resistivity was measured with a digital multimeter (produced by Matsushita Electric Co.) at 23° C. and 30% RH.

3. Light Transmittance:

The light transmittance of each video tape sample was measured with an optical tester VT-2M (produced by JVC Co.) for VHS cassettes.

4. Running Durability:

Each video tape sample (T-120; 120 minutes-length) was set in the above-mentioned VTR and subjected to a repeated running test for its full length at 40° C. and 80% RH. The number of the repeated running times of each tape sample was counted before the signals previously recorded on the tape sample became disappeared in the monitor due to head clogging.

TABLE 5

| | Carbon Black Added to Lower Magnetic Layer | | | | | |
|---|---|---|---|---|---|---|
| | Lower Magnetic Layer | Mean Particle Size (nm) | DBP Oil Absorption (ml/100 g) | pH | BET Value (m²/g) | Amount Added (wt. pts.) |
| Example 29 | A | 24 | 60 | 3.0 | 240 | 5 |
| Example 30 | A | 24 | 60 | 3.0 | 240 | 10 |
| Example 31 | A | 24 | 60 | 3.0 | 240 | 15 |
| Example 32 | B | 24 | 60 | 3.0 | 240 | 10 |
| Example 33 | A | 17 | 75 | 8.0 | 240 | 10 |
| Example 34 | B | 17 | 75 | 8.0 | 240 | 10 |
| Example 35 | A | 19 | 110 | 7.0 | 200 | 10 |
| Example 36 | B | 19 | 110 | 7.0 | 200 | 10 |
| Example 37 | A | 23 | 60 | 6.0 | 135 | 10 |
| Example 38 | B | 23 | 60 | 6.0 | 135 | 10 |
| Example 39 | | 59 | 111 | 3.0 | 45 | 10 |
| Example 40 | B | 32 | 50 | 7.0 | 240 | 10 |
| Example 41 | B | 15 | 137 | 5.0 | 175 | 10 |
| Example 42 | B | 15 | 80 | 3.0 | 850 | 10 |
| Example 43 | B | 150 | 30 | 8.0 | 8 | 10 |
| Example 44 | B | 150 | 30 | 8.0 | 8 | 10 |
| Example 45 | B | 62 | 150 | 6.0 | 40 | 10 |
| Example 46 | B | 62 | 150 | 6.0 | 40 | 10 |
| Example 47 | B | 90 | 75 | 5.0 | 300 | 10 |
| Example 48 | B | 500 | 30 | 7.0 | 5 | 10 |
| Example 49 | A | 350 | 41 | 9.5 | 6 | 10 |
| Example 50 | B | 350 | 41 | 9.5 | 6 | 10 |
| Example 51 | A | 270 | 48 | 9.5 | 10 | 10 |
| Example 52 | B | 270 | 48 | 9.5 | 10 | 10 |
| Example 53 | A | 28 | 200 | 7.0 | 800 | 10 |
| Example 54 | B | 28 | 200 | 7.0 | 800 | 10 |
| Example 55 | B | 20 | 228 | 5.0 | 1066 | 10 |
| Example 56 | B | 13 | 100 | 3.0 | 980 | 10 |
| Example 57 | B | 180 | 40 | 9.0 | 12 | 10 |
| Example 58 | B | 17 | 20 | 5.0 | 205 | 10 |
| Example 59 | B | 31 | 180 | 6.0 | 30 | 10 |
| Example 60 | B | 31 | 180 | 6.0 | 30 | 10 |
| Example 61 | B | 100 | 60 | 7.0 | 350 | 10 |

TABLE 6

| | Characteristics of Single-layer-coated Tape | | Characteristics of Double-layer-coated Tape (1.2 μm upper layer + 1.8 μm lower layer) | | | | | | |
|---|---|---|---|---|---|---|---|---|---|
| | Dispersibility | Br (mT) | RF-OUT (dB) | Y-S/N (dB) | C-OUT (dB) | C-S/N (dB) | Surface Electric Resistivity (Ω/sq) | Light Transmittance (%) | Running Durability (times) |
| Example 29 | ○ | 148.8 | 0.3 | 0.2 | 0.5 | 0.4 | $8.9 \times 10^9$ | 0.80 | 240 |
| Example 30 | ○ | 119.1 | 0 | 0 | 0 | 0 | $1.8 \times 10^8$ | 0.53 | 300 or more |
| Example 31 | Δ | 90.4 | −0.4 | −0.1 | −0.2 | −0.2 | $4.6 \times 10^7$ | 0.29 | 300 or more |
| Example 32 | ○ | 119.5 | 0.1 | 0 | 0 | 0 | $2.0 \times 10^8$ | 0.51 | 300 or more |
| Example 33 | ○ | 120.0 | 0 | −0.1 | −0.1 | 0.1 | $2.2 \times 10^8$ | 0.55 | 300 or more |
| Example 34 | ○ | 121.3 | −0.1 | −0.1 | 0 | 0 | $1.7 \times 10^8$ | 0.53 | 300 or more |
| Example 35 | ○ | 122.3 | 0 | −0.1 | 0.1 | 0 | $1.9 \times 10^8$ | 0.49 | 300 or more |
| Example 36 | ○ | 120.6 | 0 | −0.1 | 0 | −0.1 | $1.7 \times 10^8$ | 0.50 | 300 or more |
| Example 37 | ○ | 118.9 | 0.1 | 0 | 0.2 | 0 | $1.7 \times 10^8$ | 0.51 | 300 or more |
| Example 38 | ○ | 119.7 | 0.1 | −0.1 | 0 | 0 | $1.8 \times 10^8$ | 0.62 | 300 or more |
| Example 39 | ○ | 124.6 | 0.2 | 0.1 | 1.0 | −0.2 | $1.2 \times 10^8$ | 0.46 | 300 or more |
| Example 40 | ○ | 126.1 | 0.3 | 0 | 0 | −0.1 | $1.1 \times 10^8$ | 0.49 | 300 or more |
| Example 41 | ○ | 119.4 | −0.1 | 0 | −0.1 | 0.1 | $1.5 \times 10^8$ | 0.55 | 300 or more |
| Example 42 | ○ | 109.1 | −0.1 | −0.2 | −0.2 | −0.2 | $1.0 \times 10^8$ | 0.61 | 300 or more |

TABLE 6-continued

| | Characteristics of Single-layer-coated Tape | | Characteristics of Double-layer-coated Tape (1.2 μm upper layer + 1.8 μm lower layer) | | | | | | |
|---|---|---|---|---|---|---|---|---|---|
| | Dispersibility | Br (mT) | RF-OUT (dB) | Y-S/N (dB) | C-OUT (dB) | C-S/N (dB) | Surface Electric Resistivity (Ω/sq) | Light Transmittance (%) | Running Durability (times) |
| Example 43 | Δ | 101.2 | −0.2 | −0.3 | −0.2 | −0.3 | $1.1 \times 10^8$ | 0.58 | 300 or more |
| Example 44 | Δ | 94.2 | −0.5 | −0.2 | −0.4 | −0.4 | $8.1 \times 10^7$ | 0.41 | 300 or more |
| Example 45 | Δ | 96.3 | −0.5 | 0 | 0 | −0.1 | $9.8 \times 10^7$ | 0.52 | 300 or more |
| Example 46 | Δ | 91.7 | −0.2 | 0 | 0.1 | −0.1 | $1.1 \times 10^8$ | 0.60 | 300 or more |
| Example 47 | O | 120.4 | 0.1 | 0 | 0.1 | 0.2 | $1.2 \times 10^8$ | 0.55 | 300 or mo |
| Example 48 | O | 110.6 | −1.0 | −0.9 | −0.9 | −0.7 | $1.1 \times 10^8$ | 0.69 | 300 or more |
| Example 49 | O | 117.5 | −0.8 | −0.8 | −0.7 | −0.5 | $1.3 \times 10^8$ | 0.60 | 300 |
| Example 50 | O | 117.6 | −0.9 | −0.9 | −0.6 | −0.6 | $1.2 \times 10^8$ | 0.58 | 300 |
| Example 51 | O | 120.1 | −0.7 | −0.5 | −0.6 | −0.5 | $9.9 \times 10^7$ | 0.49 | 300 |
| Example 52 | O | 121.0 | −0.6 | −0.5 | −0.4 | −0.5 | $1.0 \times 10^8$ | 0.50 | 300 |
| Example 53 | X | 95.3 | −1.2 | −1.0 | −1.3 | −0.9 | $8.7 \times 10^7$ | 0.52 | 300 |
| Example 54 | X | 94.2 | −1.3 | −1.2 | −1.0 | −0.7 | $8.6 \times 10^7$ | 0.56 | 300 |
| Example 55 | X | 90.3 | −1.8 | −1.5 | −1.4 | −0.9 | $7.6 \times 10^7$ | 0.61 | 300 |
| Example 56 | X | 96.1 | −1.2 | −0.9 | −0.8 | −0.8 | $8.8 \times 10^7$ | 0.54 | 300 |
| Example 57 | X | 94.4 | −1.0 | −1.0 | −0.7 | −0.6 | $8.2 \times 10^7$ | 0.61 | 300 |
| Example 58 | X | 90.4 | −0.8 | −0.7 | −0.9 | −0.8 | $8.6 \times 10^7$ | 0.58 | 300 |
| Example 59 | X | 92.3 | −0.8 | −0.7 | −0.6 | −0.5 | $8.6 \times 10^7$ | 0.50 | 300 |
| Example 60 | X | 95.1 | −1.0 | −0.8 | −0.6 | −0.4 | $7.9 \times 10^7$ | 0.51 | 300 |
| Example 61 | X | 92.1 | −1.3 | −1.0 | −0.6 | −0.6 | $8.0 \times 10^7$ | 0.60 | 300 |

From the results in Table 6 above, it is known that carbon black having a DBP oil absorption of from 30 to 150 ml/100 g, a mean particle size of from 5 to 150 nm and a specific surface area measured by a BET method of from 40 to 400 m²/g was preferably added to the lower magnetic layer.

However, the surface property of the lower magnetic layer containing carbon black having a large mean particle size such as that used in Examples 48 to 52 was relatively bad so that the S/N ratio of the tapes having such a rough lower layer was increased and it was often impossible to obtain a sufficient output power of the tapes. On the other hand, it is known that the dispersibility of the coating compositions containing carbon black having a BET value of larger than 300 m²/g and a DBP oil absorption of larger than 150 mg/100 g was unsatisfactory since the carbon black added had a viscous structure, with the result that the Br value of the tapes having the lower layer containing such carbon black was noticeably lowered. The dispersibility of the coating compositions containing carbon black having a mean particle size of smaller than 5 nm, a BET value of smaller than 40 m²/g and a DBP oil absorption of smaller than 30 ml/100 g was often worsened and the electromagnetic conversion characteristics of the tapes having a lower layer containing such carbon black were often worsened.

It is also known that the preferred amount of carbon black to be added to the lower magnetic layer of a tape having no back coat layer is from 5 parts by weight to 15 parts by weight. This is because, if the amount of carbon black added is too small, the surface electric resistivity of the lower layer is high with the result the tape is often entangled while wound up and the running durability of the tape is therefore worsened. If, on the contrary, the amount of carbon black added is too large, the Br value of the lower layer is lowered with the result that the electromagnetic conversion characteristics of the tape are worsened. If so, in addition, the double-layer-coated tape cannot have its intrinsic frequency characteristics.

From the above-mentioned results, it is known that the multilayer magnetic recording medium of the present invention, which contains carbon black in the lower magnetic layer containing, as the essential component of the binder, a tert-amine-polyurethane resin, have excellent characteristics.

Examples 62 to 76

These examples demonstrate a method of producing a carbon black slurry to be added to a magnetic coating composition for a lower layer, in which carbon black is first mixed and dispersed with a binder and the resulting slurry is added to a dispersion of a magnetic coating composition. Composition of Carbon Slurry to be added to lower magnetic layer:

The components mentioned below were mixed with a disper and then dispersed with a sand mill until the gloss of the resulting slurry, that was measured with a digital angle-varying glossmeter VG-1D (produced by Nippon Denshoku Kogyo KK) at an incident angle of 45°, reached 120%.

| | |
|---|---|
| Carbon black (see Table 7 below) | 100 parts |
| Tert-amine-containing polyester urethane resin (Mn = 20,000, Tg = 30° C., —N(C₂H₅)₂ content = 0.2 mmol/g) | 200 parts |
| Methyl ethyl ketone | 200 parts |
| Methyl isobutyl ketone | 100 parts |
| Toluene | 100 parts |

The carbon slurry prepared above was added to the dispersion of the remaining components of a lower magnetic layer in the manner as indicated in Table 7 below, to prepare a coating liquid for a lower magnetic layer.

This coating liquid was coated on a film substrate in the same manner as that mentioned above, and the characteristics of the single-layer-coated tape were measured in the same manner as that mentioned above. On the other hand, both the coating liquid for an upper magnetic layer and the coating liquid for a lower magnetic layer mentioned above were coated on a polyethylene terephthalate film having a thickness of 14 μm, according to a wet-on-wet coating method using a co-extrusion coater, at a thickness of 1.2 μm for the upper layer and a thickness of 1.8 μm for the lower layer, and then processed in the same manner as above. The wide magnetic film thus formed was cut into a width of ½ inch to obtain a video tape.

These video tapes of Examples 62 to 76 thus produced according to the process mentioned above were assessed with respect to the dispersibility and Br of the single-layercoated tapes and also to the video electromagnetic conversion characteristics, the electric resistance, the light transmittance and the running durability of the double-layer-coated tapes, from which the influence of the carbon slurry added to the lower magnetic layer on the characteristics of the tapes was investigated. The results obtained are shown in Table 8 below.

TABLE 7

| | Composition of Lower Magnetic Layer |
|---|---|
| Example 62 | Slurry composition containing carbon black of Example 29 |
| Example 63 | Slurry composition containing carbon black of Example 30 |
| Example 64 | Slurry composition containing carbon black of Example 31 |
| Example 65 | Slurry composition containing carbon black of Example 32 |
| Example 66 | Slurry composition containing carbon black of Example 34 |
| Example 67 | Slurry composition containing carbon black of Example 36 |
| Example 68 | Slurry composition containing carbon black of Example 38 |
| Example 69 | Slurry composition containing carbon black of Example 39 |
| Example 70 | Slurry composition containing carbon black of Example 40 |
| Example 71 | Slurry composition containing carbon black of Example 41 |
| Example 72 | Slurry composition containing carbon black of Example 48 |
| Example 73 | Slurry composition containing carbon black of Example 50 |
| Example 74 | Slurry composition containing carbon black of Example 52 |
| Example 75 | Slurry composition containing carbon black of Example 54 |
| Example 76 | Slurry composition containing carbon black of Example 55 | noticeable with the increase in the amount of carbon black added. In addition, it is also known that the light transmittance and the electric resistance of the former were higher than that of the latter (see the results of Examples 29, etc.). This is because the dispersibility of the former coating composition itself is better than that of the latter coating composition.

However, it is known that, even though the slurry of carbon black was added to the magnetic coating composition, sufficient effects were difficult to obtain if carbon black having a large mean particle size, a large oil absorption and a large specific surface area was used. In particular, the chroma S/N ratio of the double-layer-coated tapes containing such carbon black was often bad.

As has been described in detail hereinabove, the magnetic recording media of the present invention, in which the binder in the lower magnetic layer comprises only polyurethane resin(s) having tertiary amines as polar groups or the resin(s) and a curing agent or comprises a mixed system composed of polyurethane resin(s) having tertiary amines as polar groups and amine-modified vinyl chloride-based resin(s) or these resins and a curing agent, have improved characteristics.

Specifically, the coating magnetic compositions of the present invention have improved coatability, and the magnetic recording media of the present invention have improved electromagnetic conversion characteristics (especially with respect to video S/N, chroma output power, chroma S/N). In addition, since the crosslinking of the components constituting the lower magnetic layer has been improved according to the present invention, the dropout of the media of the present invention is not increased even after the media have been stored. Therefore, according to the present invention, it is possible to provide magnetic recording media capable of being subjected to long-sustained, high-quality recording and reproduction in severe conditions.

TABLE 8

| | Characteristics of Single-layer-coated Tape | | Characteristics of Double-layer-coated Tape (1.2 μm upper layer + 1.8 μm lower layer) | | | | | | |
|---|---|---|---|---|---|---|---|---|---|
| | Dispersibility | Br (mT) | RF-OUT (dB) | Y-S/N (dB) | C-OUT (dB) | C-S/N (dB) | Surface Electric Resistivity (Ω/sq) | Light Transmittance (%) | Running Durability (times) |
| Example 62 | O | 166.8 | 0.6 | 0.4 | 0.6 | 0.5 | $9.5 \times 10^9$ | 0.85 | 250 |
| Example 63 | O | 152.8 | 0.4 | 0.2 | 0.5 | 0.5 | $3.7 \times 10^8$ | 0.60 | 300 or more |
| Example 64 | O | 135.5 | 0.2 | 0.1 | 0.4 | 0.3 | $9.1 \times 10^7$ | 0.32 | 300 or more |
| Example 65 | O | 153.0 | 0.3 | 0.2 | 0.4 | 0.4 | $4.9 \times 10^8$ | 0.61 | 300 or more |
| Example 66 | O | 150.1 | 0.3 | 0.1 | 0.3 | 0.4 | $5.1 \times 10^8$ | 0.59 | 300 or more |
| Example 67 | O | 152.4 | 0.4 | 0.2 | 0.4 | 0.5 | $3.9 \times 10^8$ | 0.60 | 300 or more |
| Example 68 | O | 152.8 | 0.4 | 0.2 | 0.3 | 0.4 | $4.2 \times 10^8$ | 0.58 | 300 or more |
| Example 69 | O | 151.2 | 0.3 | 0.2 | 0.3 | 0.3 | $4.7 \times 10^8$ | 0.57 | 300 or more |
| Example 70 | O | 152.0 | 0.3 | 0.2 | 0.2 | 0.3 | $3.8 \times 10^8$ | 0.59 | 300 or more |
| Example 71 | O | 151.6 | 0.2 | 0.2 | 0.3 | 0.2 | $4.2 \times 10^8$ | 0.59 | 300 or more |
| Example 72 | O | 138.3 | −0.2 | −0.1 | −0.1 | −0.3 | $5.6 \times 10^8$ | 0.66 | 300 or more |
| Example 73 | O | 140.2 | −0.1 | −0.1 | 0 | −0.2 | $4.8 \times 10^8$ | 0.63 | 300 |
| Example 74 | O | 139.6 | −0.1 | 0 | −0.1 | −0.2 | $4.3 \times 10^8$ | 0.54 | 300 |
| Example 75 | X | 108.1 | −0.3 | −0.2 | −0.2 | −0.4 | $6.3 \times 10^8$ | 0.52 | 300 |
| Example 76 | X | 105.4 | −0.4 | −0.3 | −0.2 | −0.4 | $7.1 \times 10^8$ | 0.56 | 300 |

From the results in Table 8 above, it is known that the Br value of the magnetic layer made of a coating composition containing the slurry of carbon black prepared herein was higher by 20 to 30% than that of the magnetic layer made of the same coating composition except for the slurry of carbon black (see the results of Examples 29, etc.). This is more The characteristics of the magnetic recording media of the present invention, having, as the binder in the lower magnetic layer, the above-mentioned resin(s) having particular polar groups, are improved more, if the carbon black to be added to said lower magnetic layer is specifically defined with respect to its mean particle size, etc. Specifically, the coatability of the magnetic coating compositions containing specifically-defined carbon black is improved with the result that the electromagnetic conversion characteristics (especially, video S/N, chroma output power, chroma S/N) of the media having a magnetic layer made of said composition are improved. Thus, the present invention is especially effective to improve the characteristics of magnetic recording medium not having a back coat layer so as to solve their problems about electric resistance and light transmittance.

According to the present invention, therefore, it is possible to provide low-priced magnetic recording media having high reliability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:

a non-magnetic support having a surface, a lower magnetic layer disposed on said surface and an upper magnetic layer disposed on said lower magnetic layer, said lower magnetic layer being a composition comprising:

a ferromagnetic powder;

from about 5 to about 15% by weight based on the weight of the ferromagnetic powder of a carbon black having a DPB oil absorption of from 3 to 150 ml/100 g, a mean particle size of from about 5 to 150 nm and a specific surface area measured by a BET method of from 40 to 300 $m^2/g$; and a resin binder, said resin binder consisting essentially of:
      from about 50 to 100% by weight based on binder of a tertiary amine functional polyurethane having a number average molecular weight of from about 10,000 to about 70,000 having a tertiary amine group content of from about $10^{-7}$ mol/g to about $10^{-2}$ mol/g, alone or in combination with from about 0 to about 50% by weight based on binder of an amine-modified vinyl chloride copolymer having a number average molecular weight of from about 5,000 to 50,000 and having an amine group content of from about $1\times10^{-6}$ mol/g to about $1\times10^{-3}$ mol/g; and optionally, from about 0 to about 30% by weight based on binder of a polyisocyanate curing agent.

2. A magnetic recording medium as defined in claim 1, wherein said lower magnetic layer further comprises a lubricant.

3. A magnetic recording medium as defined in claim 1, wherein said lower magnetic layer further comprises a dispersing agent.

4. A magnetic recording medium as defined in claim 1, further comprising an abrasive.

5. A magnetic recording medium as defined in claim 1, further comprising an antistatic agent.

6. A magnetic recording medium as defined in claim 1, further comprising a back coat layer disposed on a surface of the substrate opposite said lower magnetic layer.

7. A magnetic recording medium as defined in claim 1, wherein said lower magnetic layer has a thickness of between about 1.5 to about 4.0 μm.

8. The magnetic recording medium according to claim 1, wherein the upper magnetic layer contains a magnetic powder having a larger specific surface area than that of the magnetic powder in the lower magnetic layer and has sufficient durability.

9. The magnetic recording medium according to claim 1, wherein a surface of the non-magnetic support opposite the lower magnetic layer is not coated.

* * * * *